United States Patent
Zhu et al.

(10) Patent No.: US 10,929,678 B2
(45) Date of Patent: Feb. 23, 2021

(54) DYNAMIC CONTROL OF COMMUNICATION CONNECTIONS FOR COMPUTING DEVICES BASED ON DETECTED EVENTS

(71) Applicant: MICROSOFT TECHNOLOGY LICENSING, LLC, Redmond, WA (US)

(72) Inventors: Robert Zhu, Bellevue, WA (US); Weiyou Cui, Redmond, WA (US); Bin Wang, Bellevue, WA (US); Ying Chin, Bellevue, WA (US); Dejun Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 68 days.

(21) Appl. No.: 16/427,333

(22) Filed: May 30, 2019

(65) Prior Publication Data

US 2020/0184226 A1 Jun. 11, 2020

Related U.S. Application Data

(60) Provisional application No. 62/777,048, filed on Dec. 7, 2018.

(51) Int. Cl.
*G06K 9/00* (2006.01)
*G01P 15/16* (2013.01)
(Continued)

(52) U.S. Cl.
CPC .......... *G06K 9/00744* (2013.01); *G01P 15/16* (2013.01); *G06K 9/00825* (2013.01);
(Continued)

(58) Field of Classification Search
None
See application file for complete search history.

(56) References Cited

U.S. PATENT DOCUMENTS 8,432,297 B2  4/2013  Sonnabend et al.
8,576,069 B2  11/2013 Nadeem et al.
(Continued)

FOREIGN PATENT DOCUMENTS

CN  202486862 U  10/2012

OTHER PUBLICATIONS

"International Search Report and Written Opinion Issued in PCT Application No. PCT/US19/063475", dated Feb. 14, 2020, 11 Pages.
(Continued)

*Primary Examiner* — Fayyaz Alam
(74) *Attorney, Agent, or Firm* — Newport IP, LLC; Scott Y. Shigeta

(57) ABSTRACT

The techniques disclosed herein provide improvements over existing systems by dynamically controlling communication connections between two or more computing devices based on the detection of specific events. Instead of requiring a device, such as an IoT device, to be continually connected to a network or a remote device, the techniques disclosed herein enable the device to remain offline until a specific event is detected. The disclosed technologies can avoid always-on network configurations while providing a desired functionality for an IoT device. For instance, some devices only connect with other computing devices or at network in response to detection of an event, then disconnect after an exchange of specific information. Such technologies can significantly reduce the power consumption of a device by only invoking connections at appropriate times.

20 Claims, 14 Drawing Sheets

(51) Int. Cl.
  *H04N 5/272* (2006.01)
  *H04W 76/14* (2018.01)
  *H04N 5/77* (2006.01)

(52) U.S. Cl.
  CPC .............. *H04N 5/272* (2013.01); *H04N 5/77* (2013.01); *H04W 76/14* (2018.02); *G06K 2009/00738* (2013.01)

(56) References Cited

U.S. PATENT DOCUMENTS

| | | | |
|---|---|---|---|
| 9,135,808 B2* | 9/2015 | Johnson | G08B 25/009 |
| 9,832,241 B1 | 11/2017 | Hayward | |
| 10,083,551 B1* | 9/2018 | Schmitt | G07C 5/085 |
| 10,715,766 B2* | 7/2020 | Yoshimura | H04N 7/188 |
| 2006/0055521 A1 | 3/2006 | Blanco et al. | |
| 2012/0044327 A1 | 2/2012 | Horita et al. | |
| 2012/0258668 A1 | 10/2012 | Rokusek et al. | |
| 2013/0286204 A1 | 10/2013 | Cheng et al. | |
| 2016/0068105 A1 | 3/2016 | Plante | |
| 2016/0227173 A1* | 8/2016 | Yamaguchi | H04N 9/8205 |
| 2017/0028935 A1 | 2/2017 | Dutta et al. | |
| 2017/0150032 A1 | 5/2017 | Chenn | |
| 2017/0337753 A1* | 11/2017 | Joodaki | G06K 9/22 |

OTHER PUBLICATIONS

"Secure360 camera", Retrieved From: https://waylens.com/support/faq/28/33, Retrieved Date: Mar. 26, 2019, 6 Pages.

* cited by examiner

DYNAMIC CONTROL OF COMMUNICATION CONNECTIONS FOR COMPUTING DEVICES BASED ON DETECTED EVENTS

CROSS-REFERENCE TO RELATED APPLICATION

This application claims the benefit of and priority to U.S. Provisional Patent Application No. 62/777,048, filed Dec. 7, 2018, the entire contents of which are hereby incorporated by reference herein.

BACKGROUND

Some computing devices, such as Internet of Things (IoT) devices, have become commonplace in a number of different industries. For example, IoT devices are used in home appliances, warehouse tracking systems, the trucking industry, etc. Despite the benefits that are provided by IoT devices, current systems have a number of drawbacks. For instance, power consumption has always presented an ongoing concern with respect to IoT devices. Some IoT devices are designed to be powered on at all times. While other IoT devices have low-power states to improve a device's power consumption. But despite the fact that some designs have low-power states, such designs are still not efficient when a device requires network access. Given such inefficiencies, there is a continual need to improve the way such devices operate and consume power.

Some IoT devices rely on remote computing devices, such as cloud-based platforms, for certain types of operations. For instance, a process for provisioning data to an IoT device can be triggered by a cloud-based system. In another example, some cloud-based platforms can grant permissions to a requesting IoT device. Cloud-based systems are appropriate for large scale applications, which can include IoT devices deployed at fixed locations. However, such configurations are not optimal for all use scenarios, particularly when a use scenario requires an IoT device to have more mobility.

In general, when IoT devices are used in mobile use scenarios, it can be expensive both from a cost perspective and a power consumption perspective to maintain a communication connection with other devices and services. In most instances, IoT devices that are deployed for mobile use scenarios require a continuous network connection. In some cases, the cost of maintaining a continuous network connection can discourage the use of IoT devices for some use scenarios. Further, irrespective of the cost, the amount of computing resources necessary to maintain a continuous network connection can be prohibitive.

It is with respect to these and other technical challenges that the disclosure made herein is presented.

SUMMARY

The techniques disclosed herein provide improvements over existing systems by dynamically controlling communication connections between two or more computing devices based on the detection of specific events. Instead of requiring a device, such as an IoT device, to be continually connected to a network or a remote device, the techniques disclosed herein enable the device to remain offline until a specific event is detected. In response to detection of the event, the device can activate a connection for the purposes of communicating data related to the event. Once the device exchanges data related to the event, the device can terminate the connection for the purposes of preserving power and reducing the use of other computing resources.

In one illustrative example, an IoT device is configured to establish an active communication session in response to the detection of an event. This configuration provides a mechanism with improved power consumption efficiency by avoiding the need to have a continuous network connection. In addition, this configuration can reduce attack surfaces from any remote threat by providing a network connection for a limited period of time. A connection between a local device and a remote device can be established in response to the detection of a predetermined event. The predetermined event can include, for example, a collision, a mechanical failure, or a change within an environmental measurement. A collision can be detected by the use of an accelerometer in communication with the local device and/or by the analysis of video data to determine the acceleration of a physical object. A mechanical failure can be detected by the use of any sensor that can detect movement of an object in a predetermined direction or a sensor that can measure an environmental property exceeding a threshold. In another example, an event can include the detection of a specific object having specific physical properties, such as specific facial features of a person, predetermined text of a license plate, a customized painting or wrapping of a vehicle, a specific type of damage, etc.

Once an event is detected, a device can control when a connection is initiated and when it is terminated. In addition, the system can control the type of information that is exchanged based on details of the detected event. For instance, if a collision is detected between two vehicles, an IoT camera may automatically establish a connection with remote device and retrieve time and date information. The time and date information can be used to generate a record of the event with an accurate timestamp along with other data such as video data and/or location data. In addition, the IoT camera may automatically send essential information with respect to the event, such as license plate information and video and audio data related to the event. Other types of specific data, such as location information and accelerometer measurements, can be communicated based on the severity and/or other attributes of the detected event. The IoT camera can then automatically terminate the connection to conserve power and other resources once it is determined that the selected information has been communicated. The control over the connection can also reduce the device's exposure to unwarranted external access.

In another example, if mechanical failure is detected, an IoT device can establish a connection with remote device and communicate specific information with respect to the mechanical failure. For instance, an IoT device can be programmed to detect a specific sound indicating a failure, such as a blown tire, a broken fan belt, etc. Once such an event has been detected, the system can establish a connection with remote device and communicate specific information regarding the severity and/or other conditions related to the event. Once a threshold of information has been communicated, the IoT device can terminate the connection for the purposes of conserving power and reducing the device's exposure to unwarranted external access.

The technologies of this disclosure are not limited to particular IoT devices or particular computing devices. The disclosed technologies are applicable to any group of computing devices where one of the computing devices is a trusted device configured to provide reliable data and metadata to another one of the computing devices. Both computing devices being configured to send and received information wirelessly and either device, including a network device, can cause a connection between two devices in response to the and cause the termination of the connection and/or the completion of communication of specific types of data related to the event.

It is noted that the above-described subject matter can be implemented as a computer-controlled apparatus, a computer-implemented method, a computing device, or as an article of manufacture, such as a computer-readable storage medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
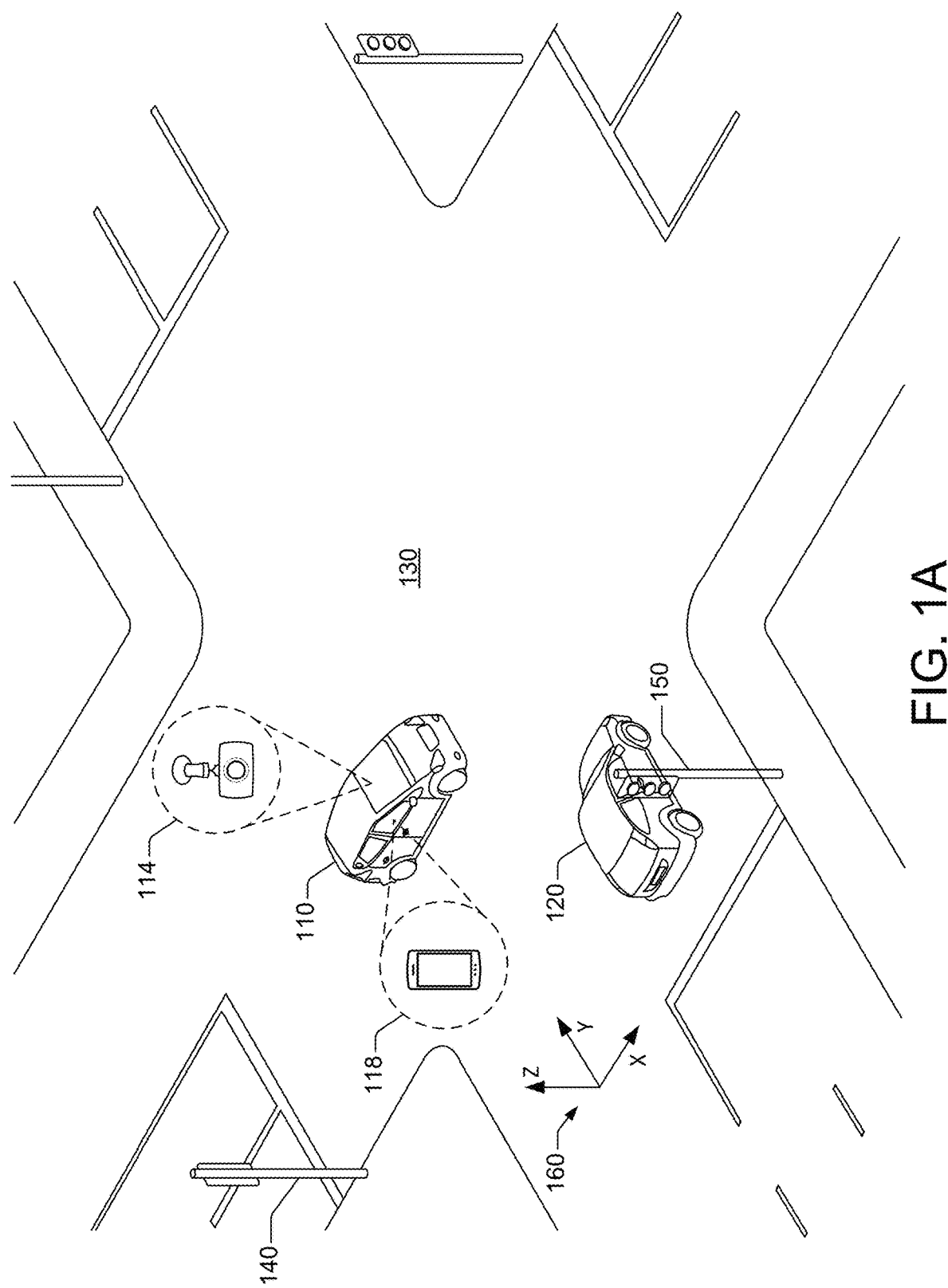
FIG. 1A presents an example of a traffic scenario involving two vehicles, in accordance with one or more embodiments of this disclosure.

The present disclosure recognizes and addresses, among other technical challenges, the issues of existing devices that utilize data connections. Conventional approaches to managing data connections and general approaches for provisioning data for such devices perform poorly and are costly to operate. Generally known approaches can limit the usability of a device given the inefficiencies caused by continuous network connections and a lack of control of the volume of data that can be communicated by a portable device.

As is described in more detail below, the present disclosure provides improvements over existing systems by controlling a connection between two or more devices in response to the detection of a predetermined event. By controlling a connection between two devices based on the detection of an event, a system can minimize the amount of resources that are required to maintain a communication connection. In addition to controlling the state of a connection based on specific events, the technologies disclosed herein can also control the type of data that is communicated between two devices based on the type of event. By controlling a communication connection between two devices and controlling the amount and/or type of data that is communicated between two or more devices, systems utilizing the techniques disclosed herein and can improve a number of efficiencies with respect to power consumption and the use of other computing resources such as processing power, network bandwidth, etc.

For illustrative purposes, consider a scenario where a device, such as an IoT device, is configured with an accelerometer and a camera. Such a device can be utilized as a dashboard camera for detecting conditions of a vehicle, such as the vehicle's acceleration, velocity, direction, etc. The device can also be configured with a communication module, such as a Bluetooth, Wi-Fi or Wi-Fi direct device, to establish connections with one or more remote devices, such as a smartphone. The device, in some instances, can be configured to remain in a disconnected state from the remote device until an event related to the condition of the vehicle is detected.

Using the one or more sensors, the device can detect an event, such as a collision, a mechanical failure, or another predetermined event. In response to detecting the event, the device can connect to the remote device. The connection between the device and the remote device can permit provisioning of specific information between the two devices. In one illustrative example, the device can send a request for time and date information from the remote device in response to the detection of the event. This scenario may be beneficial in situations where the remote device may be networked and has access to accurate time and date information. The time and date information may be utilized to create a record of the event having the date and time information received from the remote device. In some configurations, when video data is recorded, the device may store the time and date information in association with the video data to create a record of the event. Some conventions, video data or other sensor data, such as accelerometer measurements, may be communicated to the remote device response to the detection of the event. In addition, the device may also communicate other metadata, such as location information, with the remote device. By allowing the devices to exchange specific information, data defining the event can be embedded with a number of different tags and other contextual data providing a single, easy to access, resource for the event. After the device and the remote device exchange the predetermined information, the device can terminate the connection with the remote device. The termination of the connection allows each device to conserve power in some instances operate in a low-power state.

The device also can utilize the exchanged information to generate summary data that can characterize the circumstances of the defined event. For example, the dashboard camera can generate video data defining a video segment of a collision. The dashboard camera can then tag the video data with device can tag the video data by adding the received information to the video data. In addition, or in another configuration, the device can generate and provide an augmented reality (AR) video segment as the summary. The IoT device can generate and add various markings to the AR video segment in order to draw attention to particular elements of the defined event.

Figure 1B:
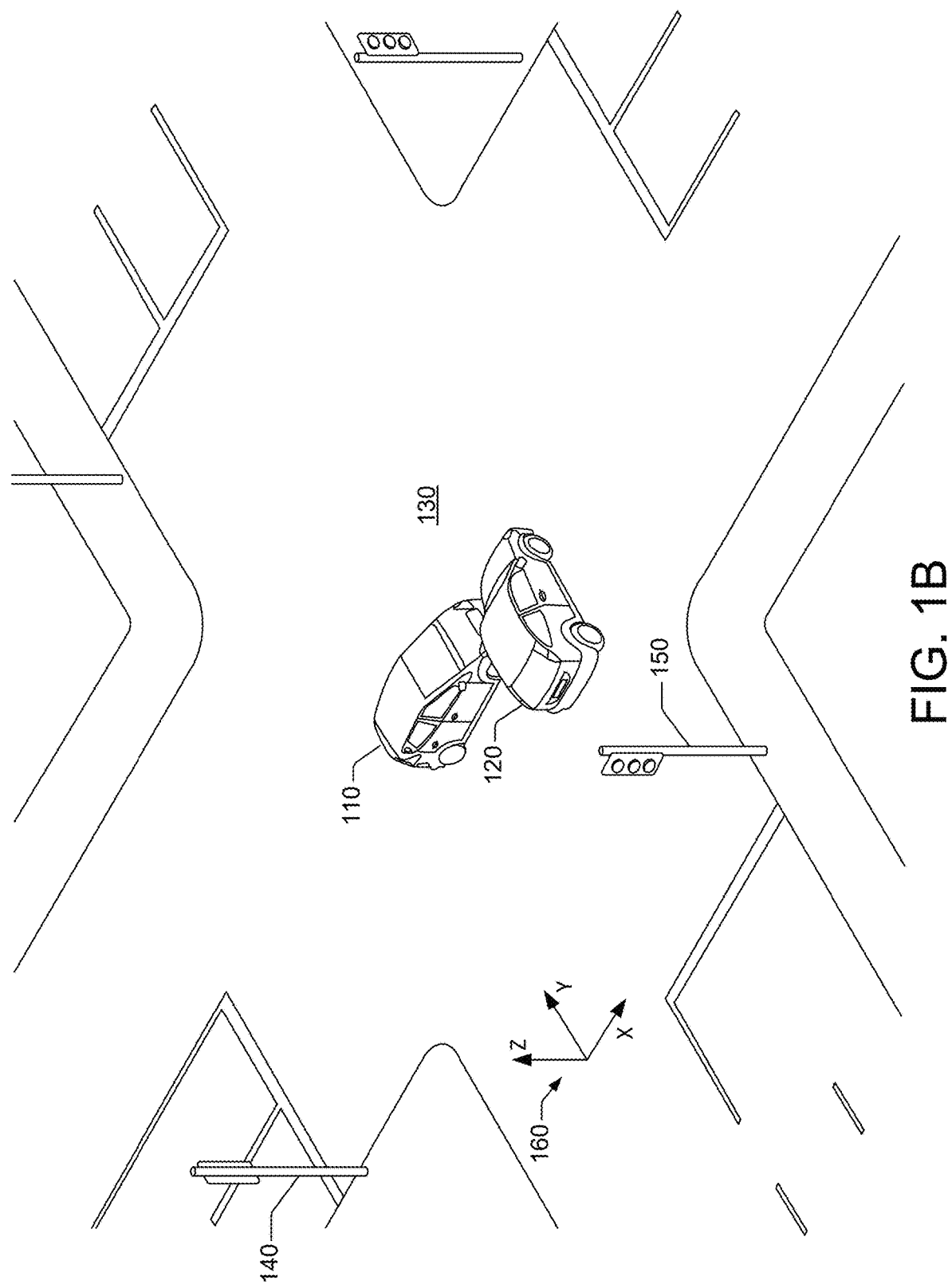
FIG. 1B presents an example of a collision subsequent to the example traffic scenario shown in FIG. 1A, in accordance with one or more embodiments of this disclosure.

FIG. 1A and FIG. 1B illustrate the above-described scenario in an example involving two vehicles. In this example, a first vehicle 110 comprises a device 114, such as a dash cam, and a remote device 118, such as a mobile phone. In this example, the first vehicle 110 collides with a second vehicle 120 causing the device 114 to establish a connection with the remote device 118 to allow the devices to exchange data regarding the incident. As described in more detail below, the connection is also terminated once the devices exchange the data associated with the incident.

FIG. 1A illustrates a traffic scenario involving the first vehicle 110 and the second vehicle 120. As is illustrated, both vehicles are moving toward one another in a street intersection 130. The first vehicle 110 can be attempting to cross the intersection 130 after a traffic light 140 has turned to red. The second vehicle 120, in turn, can be entering the intersection after a traffic light 150 has turned to green. As a result, the first vehicle 110 is accelerating along a first direction (in the Xdirection) and the second vehicle 120 is accelerating in a second direction (in the Y direction) that is essentially perpendicular to the first direction.

As is illustrated in FIG. 1B, such a scenario can result in a collision between the first vehicle 110 and the second vehicle 120. While the vehicles 110 and 120 are depicted as automobiles, the disclosed technologies also can be used in association with other types of vehicles, such as, but not limited to, motorized vessels, drones, ATVs, autonomous vehicles, etc. For illustrative purposes, the device 114 is also referred to herein as an "IoT device 114" or a "dashboard camera 114." The device 114 can be mounted on a dashboard or a rearview mirror of the first vehicle 110. The dashboard camera 114 is disconnected from a network device or another type of provisioning device. Also, in this example, the dashboard camera 114 does not have location information or a sensor for detecting a geographic location. In addition, the dashboard camera 114 includes an accelerometer detecting a level of acceleration for the dashboard camera 114 and the first vehicle 110. For efficiency purposes, it is not feasible to have the dashboard camera 114 and the remote device 118 to have a continuous communication connection. Thus, in this example, the dashboard camera 114 generally operates off-line with respect to the remote device 118.

As shown in FIG. 1B, the dashboard camera 114 can detect the collision by detecting a magnitude of acceleration in a predetermined direction. The acceleration can be monitored using sensor data generated by an accelerometer (not depicted in FIG. 1A) in communication with the dashboard camera 114. The accelerometer can either be integrated into the dashboard camera 114 or can be integrated into the vehicle 110.

By detecting the magnitude of acceleration in the predetermined direction, such as acceleration in the X direction, the incidence of false positives can be reduced when acceleration in other directions, e.g., Y or Z directions, are detected. For instance, such an acceleration detected in the X direction compared to acceleration detected in the Z direction, can allow the device to distinguish a head-on collision versus having the vehicle hit a bump in a road.

In some embodiments, the dashboard camera 114 can detect a magnitude of acceleration of the dashboard camera 114 in a second predetermined direction, e.g., the Y or Z direction. This would be in addition to detection of a magnitude of acceleration of the dashboard camera 114 in a predetermined direction, e.g., the Xdirection. In such an embodiment, the data connection between the dashboard camera 114 and a remote device, such as a watch or a smart phone, is initiated in response to determining that the magnitude of acceleration in the second predetermined direction is less than the magnitude of acceleration in the predetermined direction. In some embodiments, the data connection can be initiated in response to determining that the magnitude of acceleration in the second predetermined direction is less than the magnitude of acceleration in the predetermined direction by a predetermined difference. In some configurations, the predetermined difference can be adjusted based on one or more factors. For instance, the predetermined difference can be increased when the dashboard camera 114 receives or generates contextual data indicating a number of false-positive detections of an event. At the same time, the predetermined difference can be decreased when the dashboard camera receives or generates contextual data indicating a number of false-negative, e.g., missed, detections of one or more events.

In some embodiments, the data connection can be initiated in response to (1) detecting that the magnitude of acceleration exceeds the threshold magnitude of acceleration in the predetermined direction, e.g., the X direction, and (2) determining that the magnitude of acceleration in the second predetermined direction, e.g., the Y or Z direction, is less than the magnitude of acceleration in the predetermined direction by a predetermined difference. Similar to the example described above, the predetermined difference can be adjusted based on one or more factors. For instance, the predetermined difference can be increased when the dashboard camera 114 receives or generates contextual data indicating a number of false-positive detections of an event. At the same time, the predetermined difference can be decreased when the dashboard camera receives or generates contextual data indicating a number of false-negative, e.g., missed, detections of one or more events.

Figure 2:
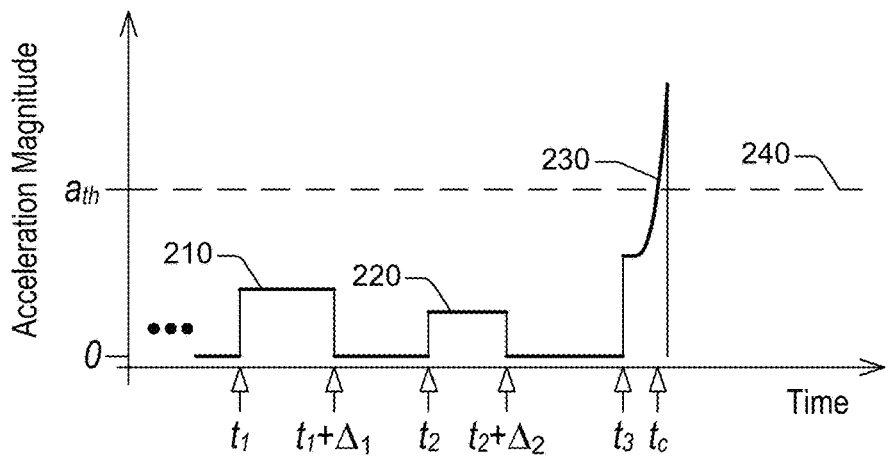
FIG. 2 presents an example of a time dependence of a magnitude of acceleration of a vehicle in the example traffic scenario shown in FIG. 1A, in accordance with one or more embodiments of this disclosure.

A result of monitoring the acceleration of the first vehicle 110 along an X direction in a coordinate system 160 is depicted in FIG. 2. Although a Cartesian coordinate system is shown, it can be appreciated that any coordinate system can be used with the described examples, including but not limited to: an orthogonal coordinate system, a polar coordinate system, or a cylindrical and spherical coordinate system.

The acceleration magnitude $a_x(t)$ in the X direction as a function of time can include periods in which the first vehicle 110 moves at essentially constant velocity ($a_x(t)$=0). During other periods, $a_x(t)$ can have an essentially constant magnitude. For instance, as is illustrated in FIG. 2, during a first period $\Delta_1$ beginning at a time $t_1$, the first vehicle 110 can move along the X direction with a first acceleration magnitude 220. During the period $\Delta_1$, for example, the first vehicle 110 may be exiting a highway and decelerating or may be passing another vehicle. During another period $\Delta_2$ beginning at a time $t_2$, the first vehicle 110 can move along the X direction with a second acceleration magnitude 230. During the period $\Delta_2$, for example, the first vehicle 110 may be slowing upon entering in a school zone during restricted hours.

At a time $t_3$, however, $a_x(t)$ can begin to increase sharply, exceeding a threshold magnitude $a_{th}$ at a time $t_c$. Such a threshold magnitude can be quantified in terms of multiples of gravity (g). For example, the threshold magnitude can be 2 g, 3 g, 4 g, 5 g, or the like. The time $t_3$ can correspond to the instant in which the first vehicle 110 begins to decelerate in the intersection 130, as a result of the second vehicle 120 also being in the intersection 130. See FIG. 1B. The time $t_c$ represents the time at which a collision between the first vehicle 110 and the second vehicle 120 occurs.

In response to an event such as a collision, it is beneficial to have a record of location data and timestamp data. Such information can supplement, for example, video footage recorded by the dashboard camera 114. Yet, the dashboard camera 114 may not have access to accurate time and date information. The dashboard camera 114 also may lack location information. Because of such needs, the technologies disclosed herein enable the dashboard camera 114 to create an on-demand connection with the remote device 118 in response to the detection of an event, such as the collision depicted in FIG. 1B. In some configurations, the dashboard camera 114 can initiate a data connection with the remote device 118 in response to detecting that the magnitude of acceleration of the first computing device exceeds the threshold magnitude of acceleration in a predetermined direction.

The dashboard camera 114 can connect wirelessly to the remote device 118. Such a connection can be accomplished, for example, by pairing the dashboard camera 120 and the remote device 118, which is illustrated as a smartphone in this example. The remote device 118 can be any device (IoT device or otherwise) that has access to reliable location information or date and time information, or both. In other examples, the remote device 118 can be a tablet, a computerized wristband, a portable GPS locator, etc.

After the remote device 118 and the dashboard camera 114 are connected, the dashboard camera 114 can receive location data and timestamp data from the remote device 118. Location data, timestamp data, and any other data can be received at the dashboard camera 114 during a specific communication session between the dashboard device 114 and the remote device 118. The timestamp data can include, for example, the time $t_c$ (FIG. 2) and/or a date when the collision was detected. In some instances, the remote device 118 can send other types of timing information in addition to, or instead of, timestamp data. For instance, that other timing information can include one or several of $t_1$, $t_2$, or $t_3$ (FIG. 2). Such timing information can be utilized to determine if the first vehicle 110 was being operated erratically. Such timing information also can be utilized to identify signs of distraction of an operator of the first vehicle 110. The timing information can include a date and/or a time of day of a detected event.

The data received from the remote device 118 constitutes metadata that can be utilized to tag video data from the dashboard camera 114. As such, received timestamp data can be integrated into video data defining a video segment generated by the dashboard camera 114 in response to the detection of the accident. Received location data also can be added to such video data. In some situations, acceleration information also can be added to the video data. The acceleration information can include, for example, acceleration magnitude or acceleration direction, or both. Such metadata is customized metadata and can be incorporated into a metadata field corresponding to a frame of the video segment.

In some scenarios, the dashboard camera 114 can request specific information from the remote device 118. For instance, the dashboard camera 114 can request accurate time and date information and/or location information. The remote device 118, such as a mobile phone, can fulfill such needs by sending the providing information to the dashboard camera 114. Therefore, in such scenarios, the provisioning can be requested by the dashboard camera 114 instead of being responsive to establishing a wireless connection between the dashboard camera 114 and the remote device 118.

After the transfer of location data and timestamp data from the remote device 118 is complete, the dashboard camera 114 can disconnect from the remote device 118. In addition to disconnecting from the remote device 118, the dashboard camera 114 can transition to a low-power state after the communication session ends.

Figure 3:
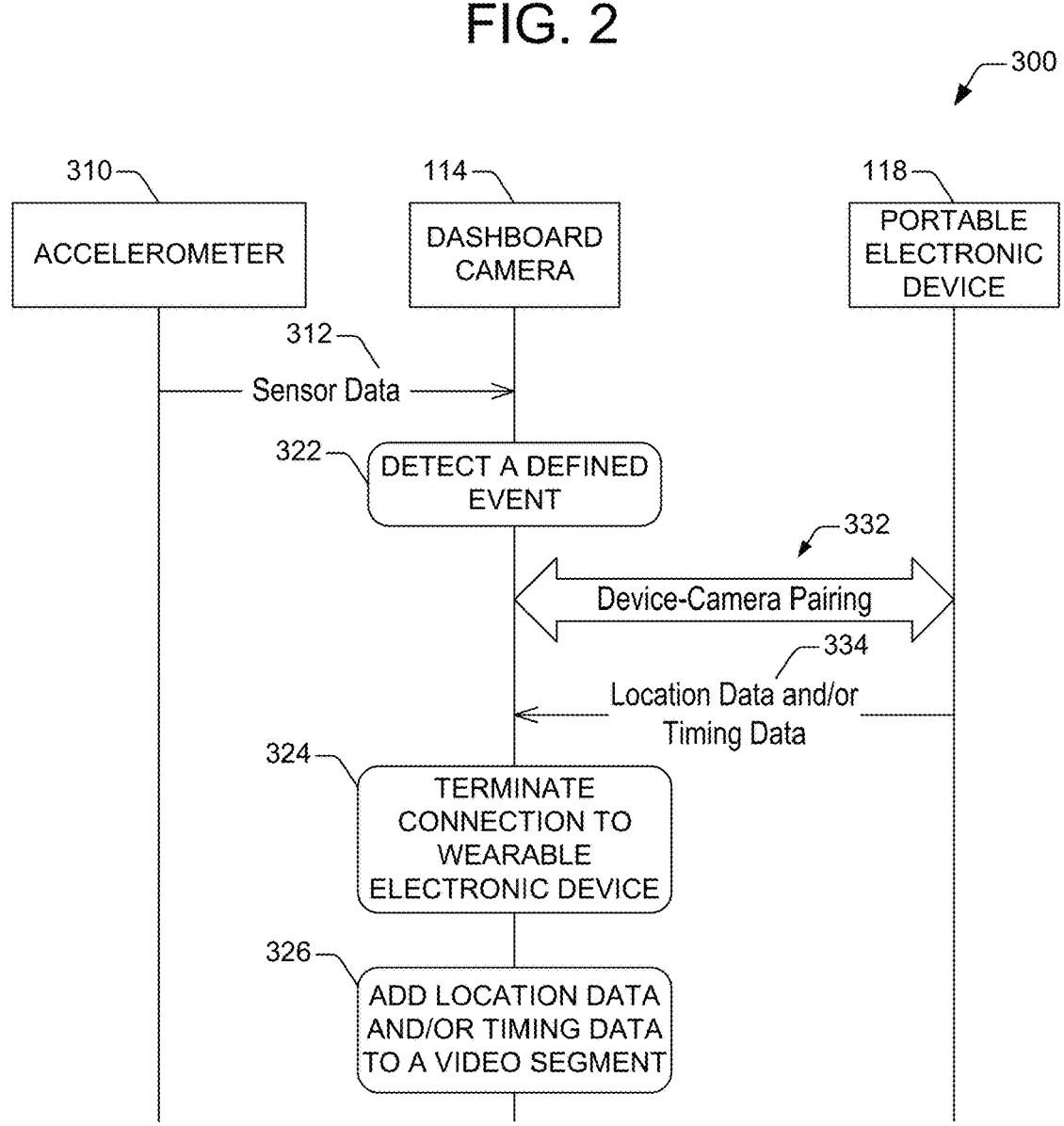
FIG. 3 presents an example of data flow and operations that can be implemented in a system of devices that are present in a vehicle involved in a defined event, in accordance with one or more embodiments in this disclosure.

FIG. 3 presents an example dataflow process of between the dashboard camera 114 and the remote device 118. As is illustrated in FIG. 3, an accelerometer 310 can generate sensor data 312 and can send the sensor data 312 to the dashboard camera 114. The accelerometer 310 can be integrated into a vehicle and can send the sensor data 312 by means of a bus architecture within the vehicle. The sensor data 312 includes acceleration information, including a magnitude of the acceleration of the vehicle or the acceleration direction, or both.

The dashboard camera 114 can receive the sensor data 312. The dashboard camera 114 can then perform operation 322 to detect a defined event using the acceleration information included in the sensor data 312. To that end, the dashboard camera 114 can analyze the acceleration information included in the sensor data 312 and can determine that a magnitude of the acceleration of the vehicle exceeds a threshold magnitude of acceleration in a predetermined direction. Such a threshold magnitude can be, for example, 2 g, 3 g, 4 g, 5 g, or the like.

Figure 4A:
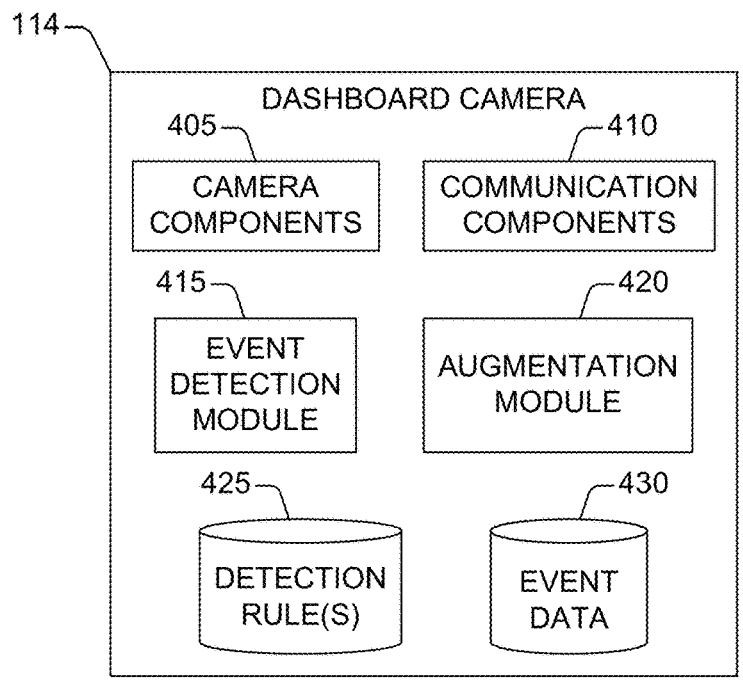
FIG. 4A presents an example of a dashboard camera that can be utilized with the disclosed technologies, in accordance with one or more embodiments.

In some embodiments, as is illustrated in FIG. 4A, the dashboard camera 114 can include an input/output (I/O) interface (not depicted in FIG. 4A) that can couple the dashboard camera 114 to the bus architecture to receive the acceleration information. The dashboard camera 114 also can include an event detection module 415 that can detect the defined event using the received acceleration information. To that, the event detection module 415 can apply a detection criterion to the acceleration information. The detection criterion dictates that magnitude of acceleration in a predetermined direction must exceed the threshold magnitude (e.g., 5 g). The detection criterion can be retained in one or more memory devices 425 (referred to as detection rule(s) 425) in the dashboard camera 114.

Returning to FIG. 3, in response to the detection of the defined event (e.g., a collision of the vehicle with another vehicle), the dashboard camera 114 can initiate a communication session between the dashboard camera 114 and the remote device 118. The communication session can be initiated by pairing the dashboard camera 114 and the remote device 118. Thus, the dashboard camera 114 and the remote device 118 can exchange pairing messages 332 to establish a wireless connection between the dashboard camera 114 and the remote device 118. As is illustrated in FIG. 4A, the dashboard camera 114 can include communication components 410 than can permit exchanging the pairing messages 322. Prior to exchanging the pairing messages, the event detection module 415 can energize the communication components 410.

After the remote device 118 and the dashboard camera 114 are connected, the remote device 118 can send data 334 location data and/or time and date data ("timing data") to the dashboard camera 114. The dashboard camera 114 can receive the location data and/or the timing data wirelessly, by means of the communication components 410 shown in FIG. 4A, for example. The dashboard camera 114 can retain the location data and the timing data the one or more memory devices 430 (referred to as event data 430) shown in FIG. 4A. The timing data can include timestamp data, such as a time and a date when the magnitude of acceleration of the vehicle including the dashboard camera 114 exceeded the threshold magnitude in the predetermined direction. The location data can include, for example, coordinates that represent the location of the dashboard camera 114 at the time when the magnitude of acceleration of the vehicle exceeded the threshold magnitude in the predetermined direction. The coordinates can include latitude and longitude. In some instances, elevation also can be included in the coordinates.

It is noted that in some embodiments, the dashboard camera 114 can request specific information from the remote device 118. For instance, the dashboard camera 114 can request the data 334, or another type of data, from the remote device 118. The remote device 118 can respond by sending the requested data. Therefore, in such embodiments, the provisioning can be requested by the dashboard camera 114 instead of being caused by the remote device 118.

In response to completion of the communication of the location data and/or the timing data, the dashboard camera 114 can perform operation 324 to terminate the wireless connection between the dashboard camera 114 and the remote device 118. Completion of such a communication can be indicated by end-of-transmission (EOT) signaling or another type of signaling that conveys termination of a transmission of information, such as end-of-file (EOF) signaling). Such signaling can be received at the dashboard camera 114 from the remote device 118. Terminating such a connection can include causing the dashboard camera 114 to transition to a low-power state, thus reducing power consumption. To that, the event detection module 415 shown in FIG. 4A can power off one or multiple elements of the dashboard camera 114 while maintaining the event detection module 415 energized.

The data received from the remote device 118 constitutes metadata that can be utilized to tag imaging data defining a video segment representative of the defined event. Such metadata is customized metadata and can be incorporated into a metadata field corresponding to an image frame of the video segment. The dashboard camera 114 can generate the imaging data in response to the detection of the defined event. As is shown in FIG. 4A, the dashboard camera 114 can include camera components 405 to acquire images of the surroundings of the vehicle 110, for example. The camera components 405 can acquire images using visible light and/or infrared electromagnetic radiation. The camera components 450 can include lenses, filters, and/or other optic elements; one or more focusing mechanisms; and imaging sensors that permit capturing both still pictures and motion pictures. The imaging sensors can include one or more photodetectors, active amplifiers, and the like. For instance, the imaging sensor devices can include a charge-coupled device (CCD) camera; an active-pixel sensor or other type of complementary metal-oxide semiconductor (CMOS) based photodetector; an array of multi-channel photodiodes; a combination thereof; or the like.

Accordingly, received location data can be integrated into the imaging data after the detection of the defined event. Received timing data also can be added to the imaging data in addition to, or instead of, the addition of the location data. In some situations, acceleration information can be added to the imaging data. The dashboard camera 114 can perform an operation 326 to add the received location data or timing data, or both, to the video segment. In some embodiments, as is illustrated in FIG. 4A, the dashboard camera 114 can include an augmentation module 420 that can perform the operation 326.

Figure 4B:
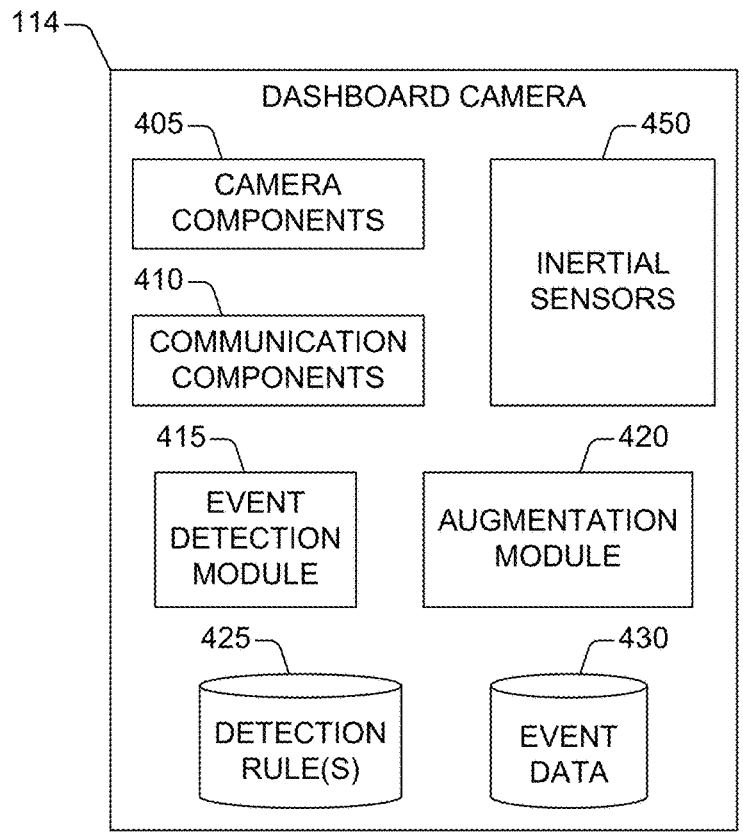
FIG. 4B presents another example of a dashboard camera that can be utilized with the disclosed technologies, in accordance with one or more embodiments.

It is noted that, while the accelerometer 310 in FIG. 3 is external to the dashboard camera 114, the disclosure is not limited to such implementations. There are configurations where the accelerometer can be included in a group of inertial sensors 450 integrated into the dashboard camera 114, as is illustrated in FIG. 4B.

The disclosed technologies are not limited to the example of reactive provisioning data in FIG. 3. There is no requirement for these technologies to be implemented in the remote device 118 and the dashboard camera 114 in a vehicular scenario. The disclosed technologies are indeed applicable to other types of IoT devices where one of such IoT devices is a trusted device configured to provide reliable data and metadata to another one of the IoT devices. The trusted device can be verified via an authentication process. Further, after a connection is established, an initially disconnected IoT device can receive any metadata in addition to other data from the trusted IoT. The metadata can permit characterizing the predetermined event that causes the provisioning of the disconnected IoT device.

Figure 5A:
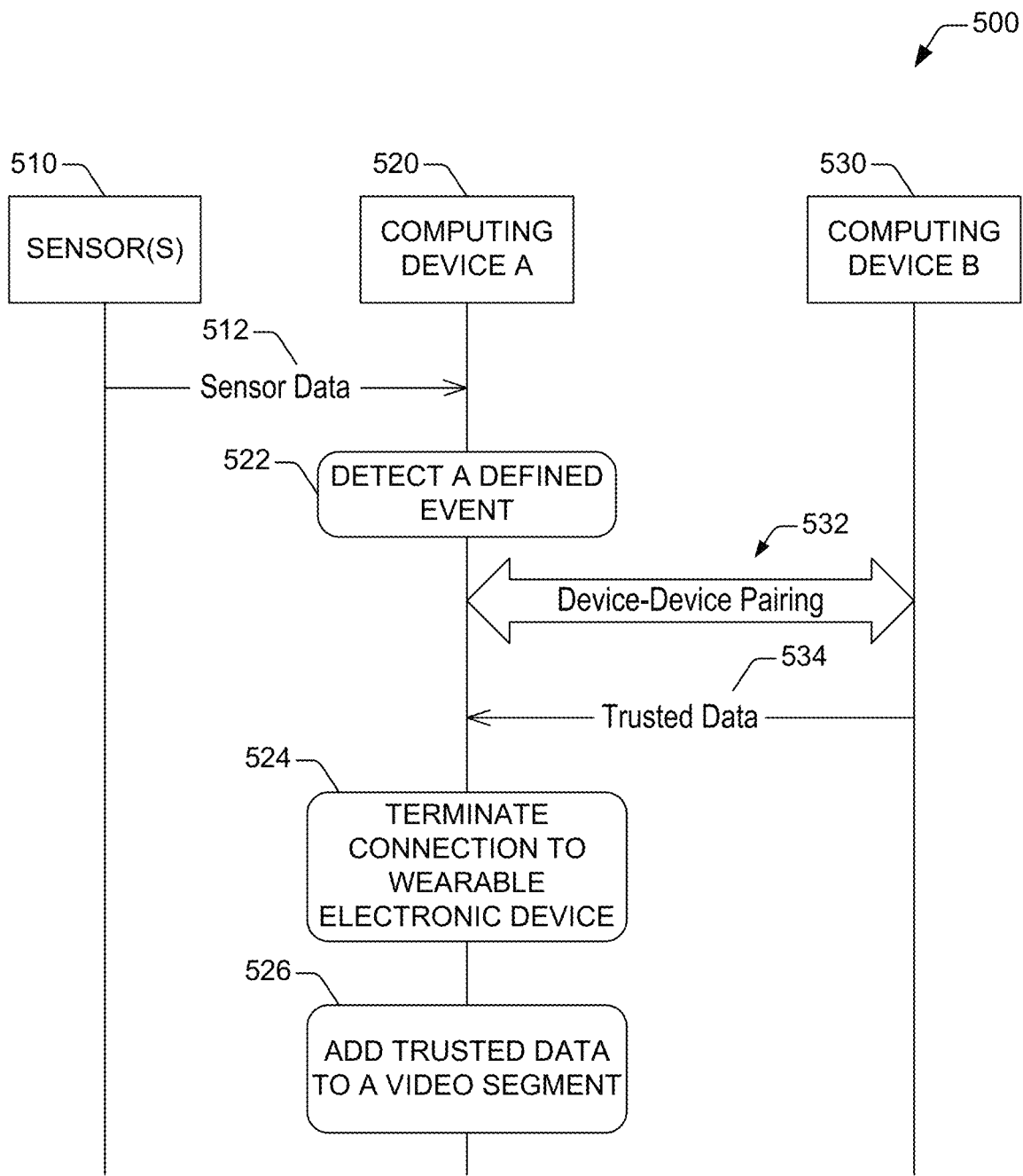
FIG. 5A presents another example of data flow and operations that can be implemented in a system of devices that are present in a vehicle involved in a defined event, in accordance with one or more embodiments in this disclosure.
Figure 5B:
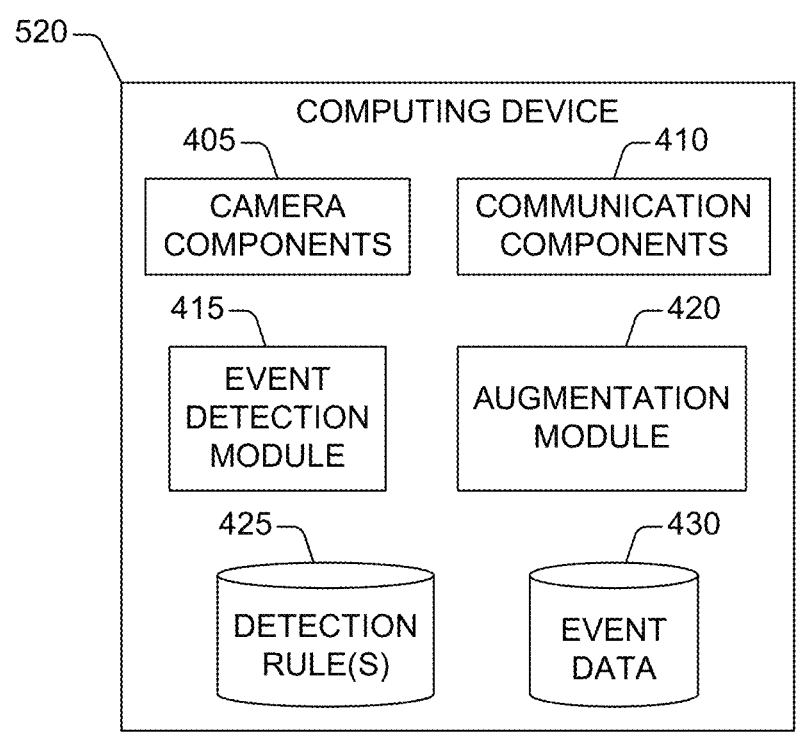
FIG. 5B presents an example of a computing device that can be utilized with the disclosed technologies, in accordance with one or more embodiments.
Figure 5C:
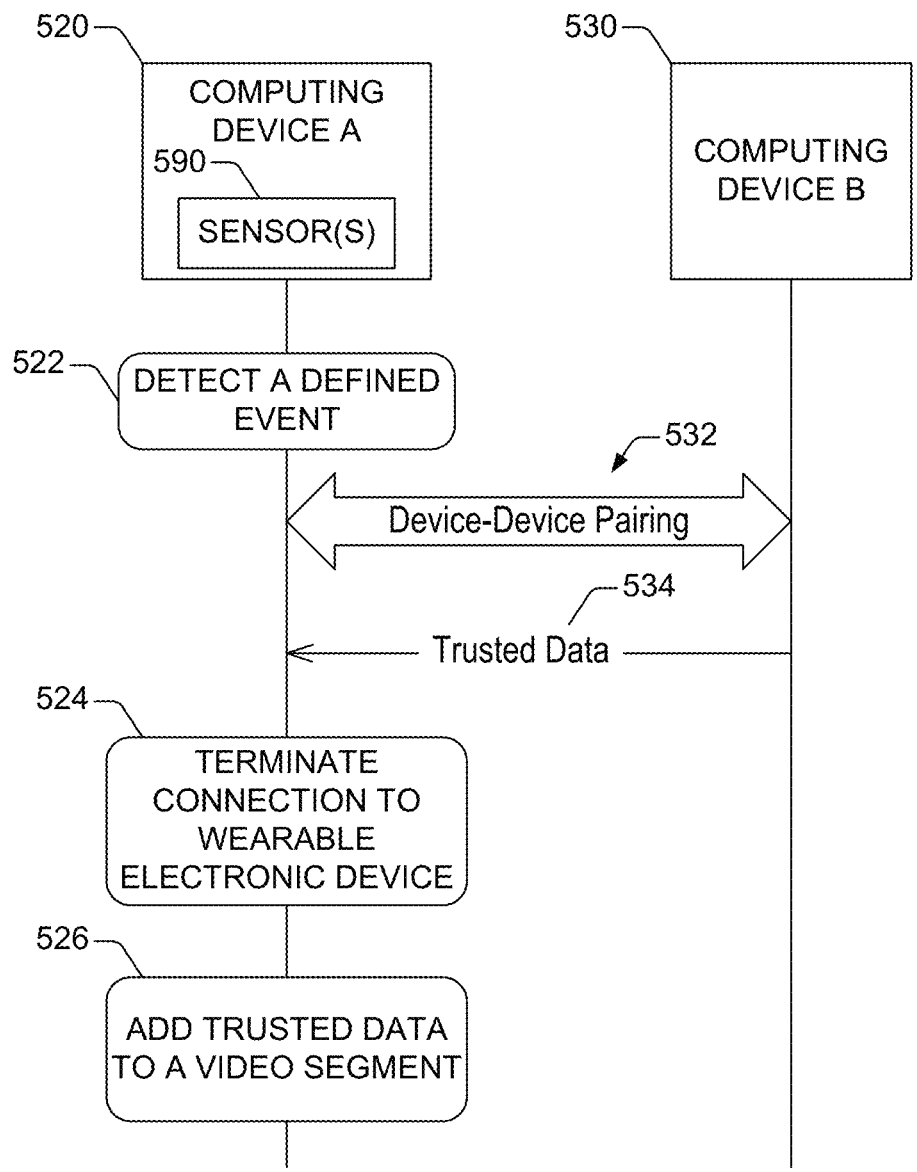
FIG. 5C presents yet another example of data flow and operations that can be implemented in a system of devices that are present in a vehicle involved in a defined event, in accordance with one or more embodiments in this disclosure.

The disclosed technologies are not limited to provisioning data in response to a collision between vehicles or between a vehicle and another object. Data can be provisioned to a computing device (an IoT device or otherwise) in response to detection of other types of defined events. such as a vehicle rollover, an electromechanical malfunction of a vehicle, ignition of a fire in a battery in an electric vehicle, or similar. Such a malfunction can include, for example, the destruction of a tire of the vehicle or a catastrophic increase of operating temperature in a combustion engine of the vehicle. FIGS. 5A, 5B and 5C illustrate a more generic description of a process for dynamically controlling a communication connection in response to detecting an event.

Specifically, FIG. 5A illustrates an example of data flow and operations that can be implemented in a system of devices that are present in a vehicle involved in a defined event. As is illustrated, a group of sensors 510 can generate sensor data 512. The group of sensors 510 can be integrated into a vehicle and can include, for example. inertial sensors, temperature sensors, pressure sensors, electric charge sensors, and the like. Thus, each one of the group of sensors 350 can generate measurements of a physical property representative of an operating condition of the vehicle.

In some configurations, the inertial sensors can include an accelerometer and a gyroscope. Accordingly, the sensor data 512 includes linear acceleration information and angular acceleration information. Such information can include a magnitude of the acceleration of the vehicle or the acceleration direction, or both. The sensor data 512 also can include orientation information defining a pitch, yaw, and heading of the vehicle.

The group of sensors 510 can send the sensor data 512 to a computing device A 520. The group of sensors 510 can send the sensor data 512 by means of a bus architecture within the vehicle. The computing device A 520 can be an IoT device or another type of device having processing circuitry.

The computing device A 520 can receive the sensor data 512. The computing device A 520 can then implement operation 522 to detect a defined event using the sensor data 512 and a group of occurrence criteria. Specifically, the computing device A 520 can apply at least one criterion of the group of occurrence criteria to the sensor data 512. As a result, the computing device A 520 can determine if the sensor data 512 satisfy the at least one occurrence criterion. A determination that the sensor data 512 satisfy the at least one occurrence criterion results in the detection of the defined event.

As an illustration, the at least one occurrence criterion can include a first criterion that dictates that magnitude of acceleration in a predetermined direction must exceed a threshold magnitude (e.g., 5 g). Thus, the computing device A 520 can apply such a criterion to acceleration information included in the sensor data 512. In some instances, the acceleration information indicates that a magnitude of the acceleration of the vehicle in the predetermined direction exceeds the threshold magnitude. The computing device A 360 then determines that the magnitude criterion is satisfied, and thus detects the defined event.

As another illustration, the sensor data 512 can include pressure data identifying pressure of each tire of the vehicle that includes the group of sensors 510. The at least one occurrence criterion can include a second criterion that dictates that a change in pressure of the tire must exceed a threshold magnitude (e.g., 35 psi). Accordingly, the computing device A 520 can apply such a magnitude criterion to the received pressure data. In an instance in which the received pressure data indicate that the pressure of a tire has changed by an amount that exceeds the threshold amount. The computing device A 520 then determines that the magnitude criterion is satisfied, and thus detects the defined event.

Other criteria also be specified in order to detect a defined event, such as a vehicle rollover. For example, a criterion to detect the defined event can be satisfied when a change in a magnitude of an acceleration vector is at least equal to a threshold magnitude. As another example, another criterion to detect the accident can be satisfied when a change in the direction of the acceleration vector is at least equal to a threshold vector. Other criteria also can be utilized to identify abnormal acceleration, such as excessive angular acceleration around an axis of a vehicle 110, as it may be the case when the first vehicle 110 rolls over in a collision.

Regardless of the type of the defined event that is detected, the computing device A 360 can initiate a communication session between the computing device 520 and a computing device B 530. The computing device B 530 can be any device (IoT device or otherwise) that has access to some sort of trusted information. For example, the trusted information can include reliable timing information or location information, or both. The computing device B 530 can be, for example, a wristband electronic device, a smartphone, a portable global positioning system (GPS) receiver device, or similar. The computing device B 530 includes components (not depicted in FIG. 3B) that permit wireless communication between the computing device B 370 and external devices. Accordingly, the communication session can be initiated by pairing the computing device A 520 and the computing device B 530. Pairing such devices includes exchanging pairing messages 532 to establish a wireless connection between the computing device A 520 and the computing device B 530.

After the computing device B 530 and the computing device A 520 are connected, the computing device B 530 can send trusted data 534 to the computing device 360. The computing device A 520 can receive the trusted data wirelessly, by means of the communication components 410 shown in FIG. 5B, for example. The computing device A 520 can retain the trusted data 534 in the event data 430 shown in FIG. 5B. The trusted data 534 can include location data or timing data, or both. The timing data can include timestamp data, such as a time and a date when a measurement of a physical property representative of an operating condition of the vehicle satisfied an occurrence criterion. The location data can include, for example, a group of coordinates of the computing device A 510 at the time when the measurement of such a physical property satisfied an occurrence criterion. The group of coordinates can include latitude and longitude. In some instances, elevation also can be included in the group of coordinates.

In response to completion of the communication of the trusted data 534, the computing device 520 can perform operation 524 to terminate the wireless connection between the computing device A 520 and the computing device B 370. Completion of such a communication can be indicated by, for example, EOT signaling or another type of signaling that conveys termination of a transmission of information. Such signaling can be received at the computing device A 520 from the computing device 530. Terminating such a connection can include causing the computing device A 520 to transition to a low-power state, thus reducing power consumption. To that, one or multiple components of the computing device A 520 can be powered off while maintaining the event detection module 415 (FIG. 5B) energized.

The trusted data 524 received from the computing device 530 constitutes metadata that can be utilized to tag imaging data defining a video segment representative of the defined event. Such metadata is customized metadata and can be incorporated into a metadata field corresponding to an image frame of the video segment. The computing device A 520 can generate the imaging data in response to the detection of the defined event. The imaging data can be generated by means of an imaging sensor included in the camera components 405 (FIG. 5B). Accordingly, received location data can be integrated into the imaging data after the detection of the defined event. Received timing data also can be added to the imaging data in addition to, or instead of, the addition of the location data. In some situations, acceleration information can be added to the imaging data. The computing device A 520 can implement operation 526 to add the received trusted data 534 to the video segment. To that end, as is illustrated in FIG. 5B, the computing device A 520 can include the augmentation module 420.

It is noted that while the sensor(s) 350 in FIG. 5A are illustrated as being external to the computing device A 510, the disclosure is not limited in that respect. There are configurations where the sensor(s) 510 can be included in a group of sensors 590 integrated into the computing device A 520, as is illustrated in FIG. 5C. The group of sensors 590 also can include, in some embodiments, the imaging sensor that can generate imaging data defining a video segment.

The disclosed technologies are not limited to detecting a defined event involving a vehicle that includes a dashboard camera or another type of IoT that can generate imaging data. The disclosed technologies also can detect an accident involving other vehicles.

Figure 6A:
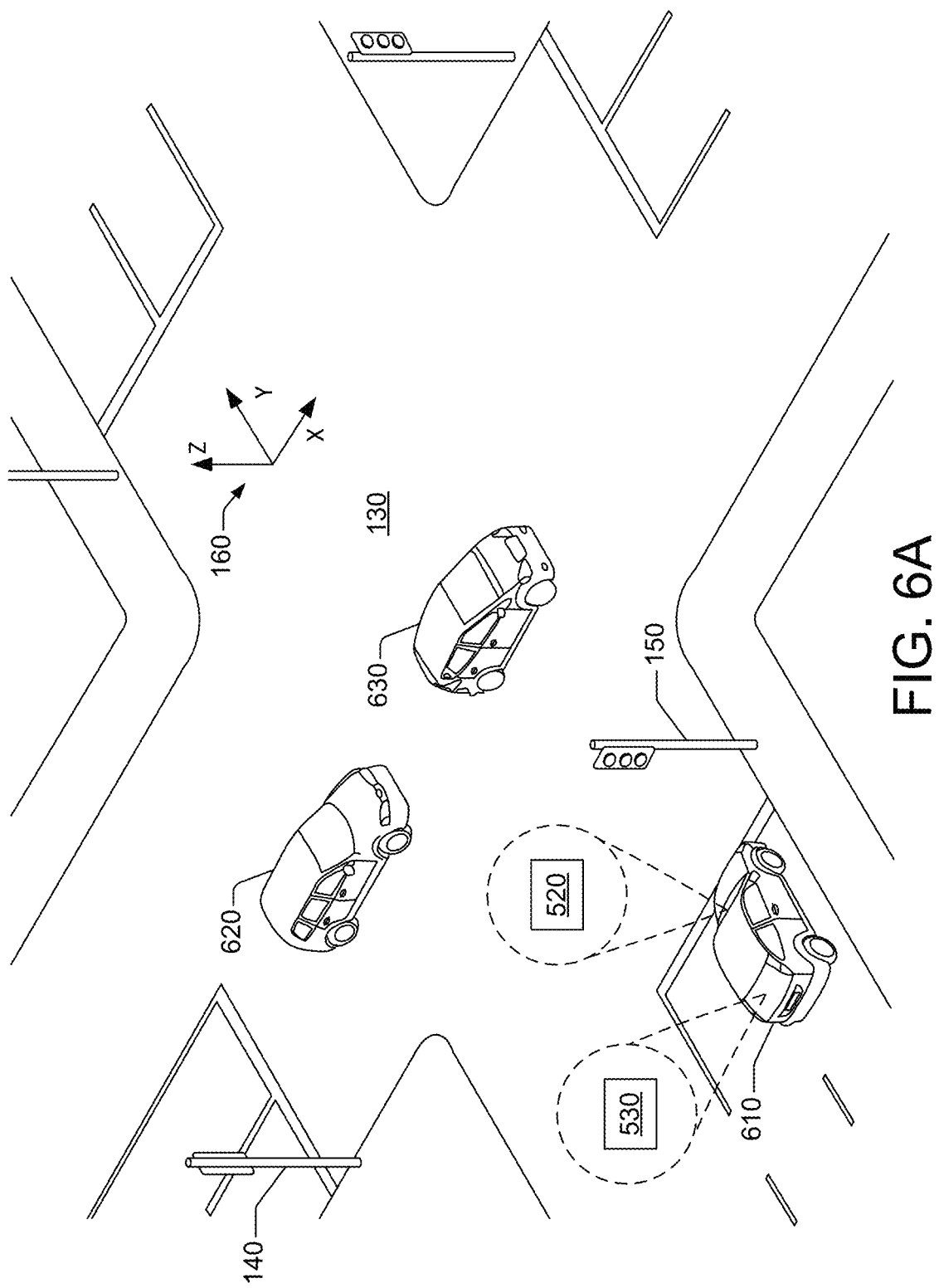
FIG. 6A presents an example of a traffic scenario involving three vehicles, in accordance with one or more embodiments of this disclosure. One of the vehicles has a computing device that can include an imaging sensor and an accelerometer or another type of inertial sensor.

As an illustration, FIG. 6A presents a scenario in which a vehicle 610 is stopped at the intersection 130 and two other vehicles 620 and 630 are traversing the intersection 130. The vehicle 610 is oriented along they direction and the other vehicles 620 and 630 are moving along the x direction. The field of view of the vehicle 610 can include both the vehicle 620 and the vehicle 630. The vehicle 610 can include the computing device A 520 and the computing device B 530, which can be initially unpaired. The computing device A 520 can include camera components 405 (FIG. 5B) that can generate imaging data representative of the surroundings of the vehicle 610. The imaging data can be generated while the computing device A 520 operates in a low-power state, for example.

Figure 6B:
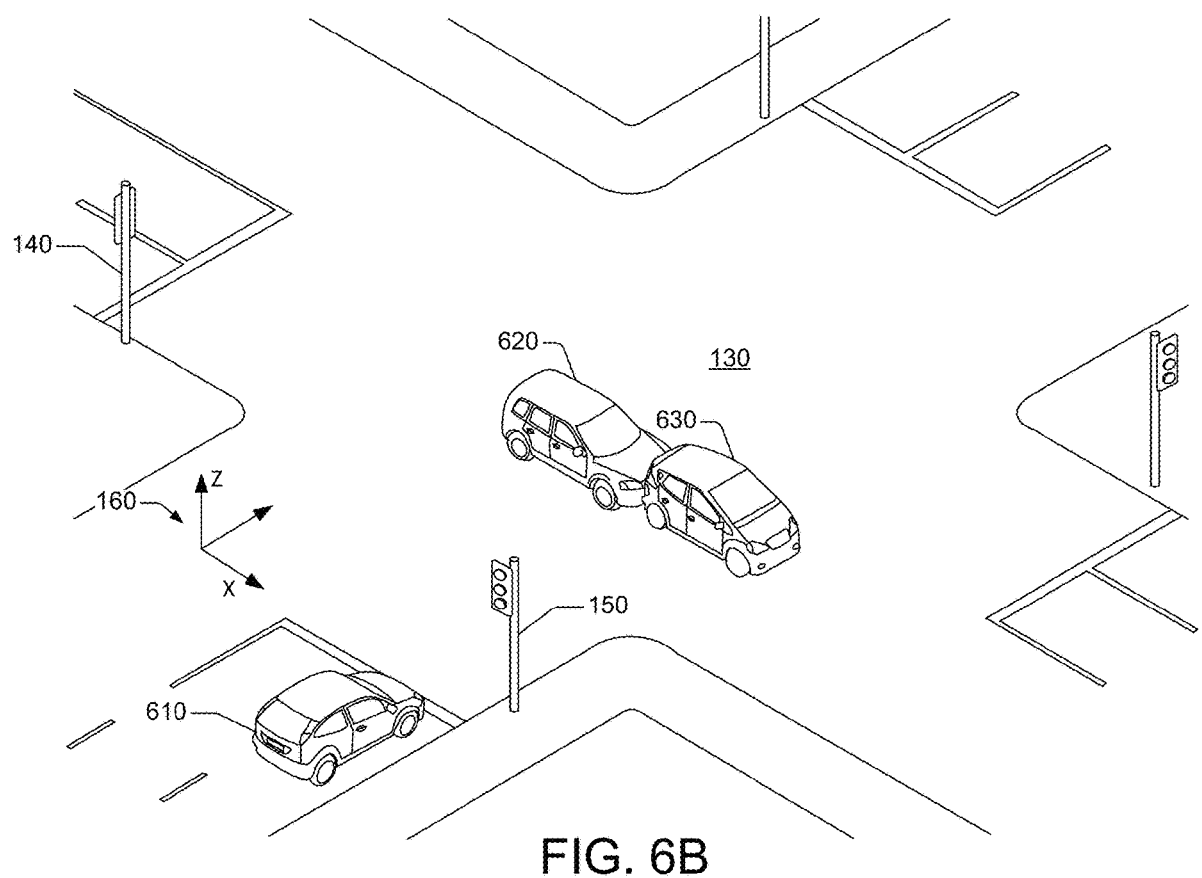
FIG. 6B presents an example of a collision subsequent to the example traffic scenario shown in FIG. 4A, in accordance with one or more embodiments of this disclosure.

The vehicle 620 and the vehicle 630 can both be moving at essentially the same speed, with the vehicle 620 behind the vehicle 630 relative to the direction of movement. At a subsequent instant, the vehicle 630 can abruptly decelerate. As a result, the vehicle 620 also can decelerate to avoid a collision with the vehicle 630. As is illustrated in FIG. 6B, in some instances, the deceleration of the vehicle 620 may not sufficient to avoid the collision.

Figure 6C:
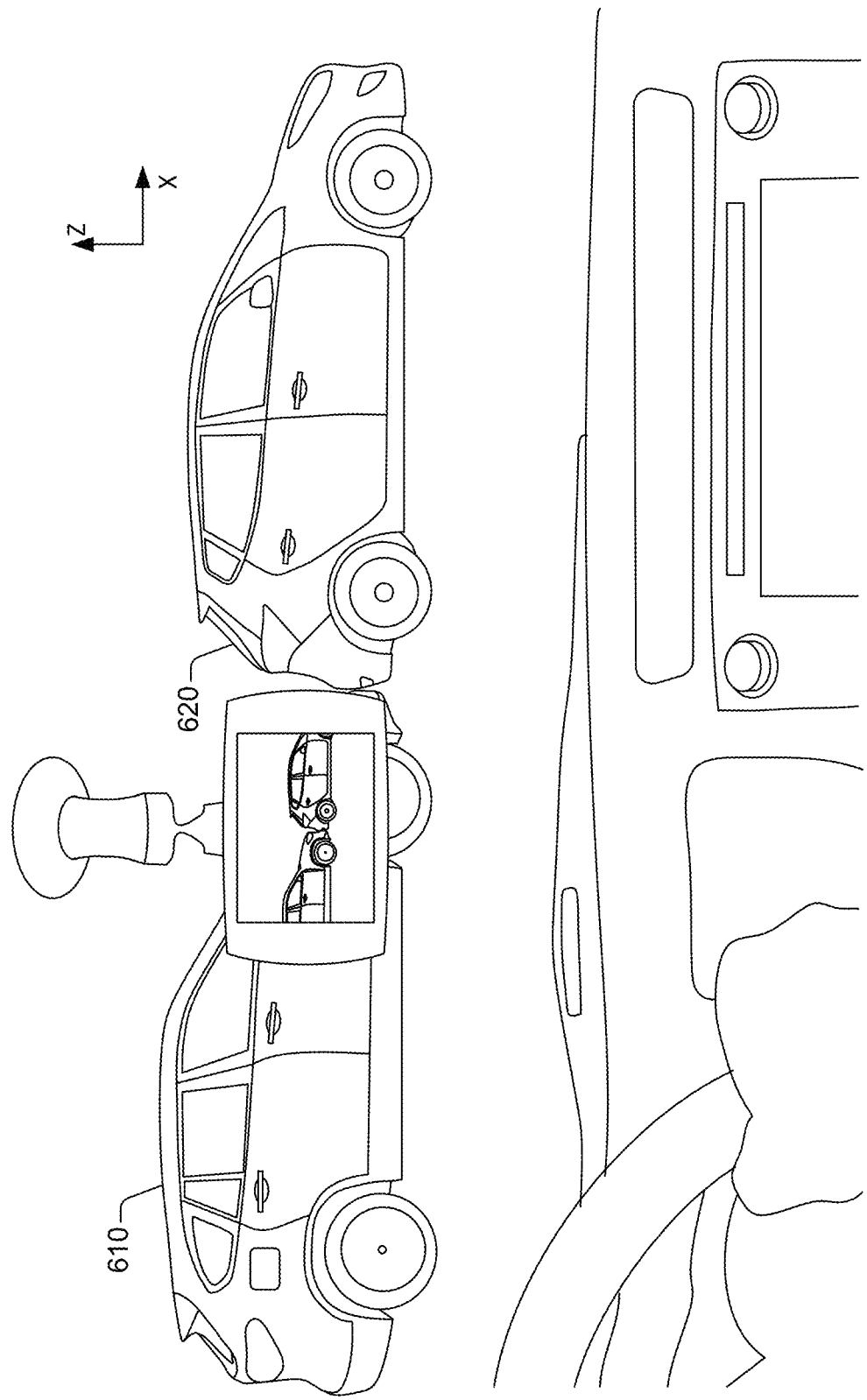
FIG. 6C presents an example of a field of view of a computing device included in a vehicle facing a collision between two other vehicles, in accordance with one or more embodiments of this disclosure.

The computing device A 510 can generate imaging data defining a video segment that records, for example, the movement of the vehicles 620 and 630 before and after the collision. Accordingly, the imaging data can represent a sequence of scenes corresponding to the movement of the vehicle 620 and the vehicle 630 across the intersection 130. The sequence of scenes is generated from the vantage point of vehicle 610. The imaging data can define multiple image frames at a defined frame rate, where each one of the multiple image frames corresponds to a scene of the sequence of scenes. FIG. 6C illustrates one of such scenes, at a time of the collision.

The computing device A 510 also can analyze the imaging data to track one or both of the vehicle 620 and the vehicle 630 across the sequence of scenes. For instance, the computing device A 510 can identify the vehicle 620 in a first scene of the sequence of scenes, and can then continue identifying the vehicle 620 in other scenes subsequent to the first scene. In some configurations, the computing device A 510 can analyze each image frame in the imaging data upon the image frame being generated. In other configurations, the computing device A 510 can analyze the image frames in batches, analyzing consecutive groups of image frames as the generation of a group of frames is complete. In some embodiments, the event detection module 415 (FIG. 5B) that can be included in the computing device A 520 can analyze the imaging data.

As part of the analysis of the imaging data, the computing device A 520 can determine a series of positions of the vehicle 620 in respective consecutive image frames of the multiple image frames. In addition, the computing device A 520 can determine a series of times for respective positions in the series of positions. The computing device A 520 can then generate estimates of the acceleration of the vehicle 620 using the series of positions and the series of times.

Using the estimate of the acceleration of the vehicle 620, the computing device A 520 can determine that a magnitude of the acceleration exceeds a threshold magnitude of acceleration in a predetermined direction. In response, the computing device A 520 can initiate a data connection between the computing device and the computing device B 530.

After the data connection is established, the computing device A 520 can receive at least one of timing information or location information from the computing device B 530. The timing information can include, for example, a time and a date when the magnitude of acceleration of the vehicle 620 exceeded the threshold magnitude of acceleration in the predetermined direction. Such a time can be the time $t_c$ (FIG. 2), for example. The location information can include, for example, a group of coordinates of the computing device B 520 at the time when the magnitude of acceleration of the second vehicle exceeded the threshold in the predetermined direction. The group of coordinates can include longitude and latitude. In some instances, elevation also can be included in the group of coordinates.

The computing device 520 A can terminate such a data connection after the communication of the timing information or the location information has been completed. Completion of the communication of such information can be indicated by the signaling received at the computing device A 520, from the computing device B 530. The signaling can include, for example, EOT signaling, EOF signaling, or similar.

The computing device A 520 can generate video data defining a video segment of the collision between the vehicle 620 and the vehicle 630. To that end, the computing device 520 can include the camera components 405 shown in FIG. 5B. In some configurations, the computing device A 520 can initiate recordation of the video segment at a first frame rate in response to the detection of the collision. The video segment can be generated in slow motion, for example, in order to record greater details of the collision. Accordingly, the first frame rate can be greater than a second frame rate configured for recordation of video footage in the absence of a collision.

Regardless of how the video data is generated, the video data can be processed in order to generate and provide a summary of the collision. In one configuration, the computing device 520 A can tag the video data by adding the received timing information or the received location information, or both, to the video data. The augmentation module 420 (FIG. 5B) that can be included in the computing device A 520 can tag the video data.

Figure 7:
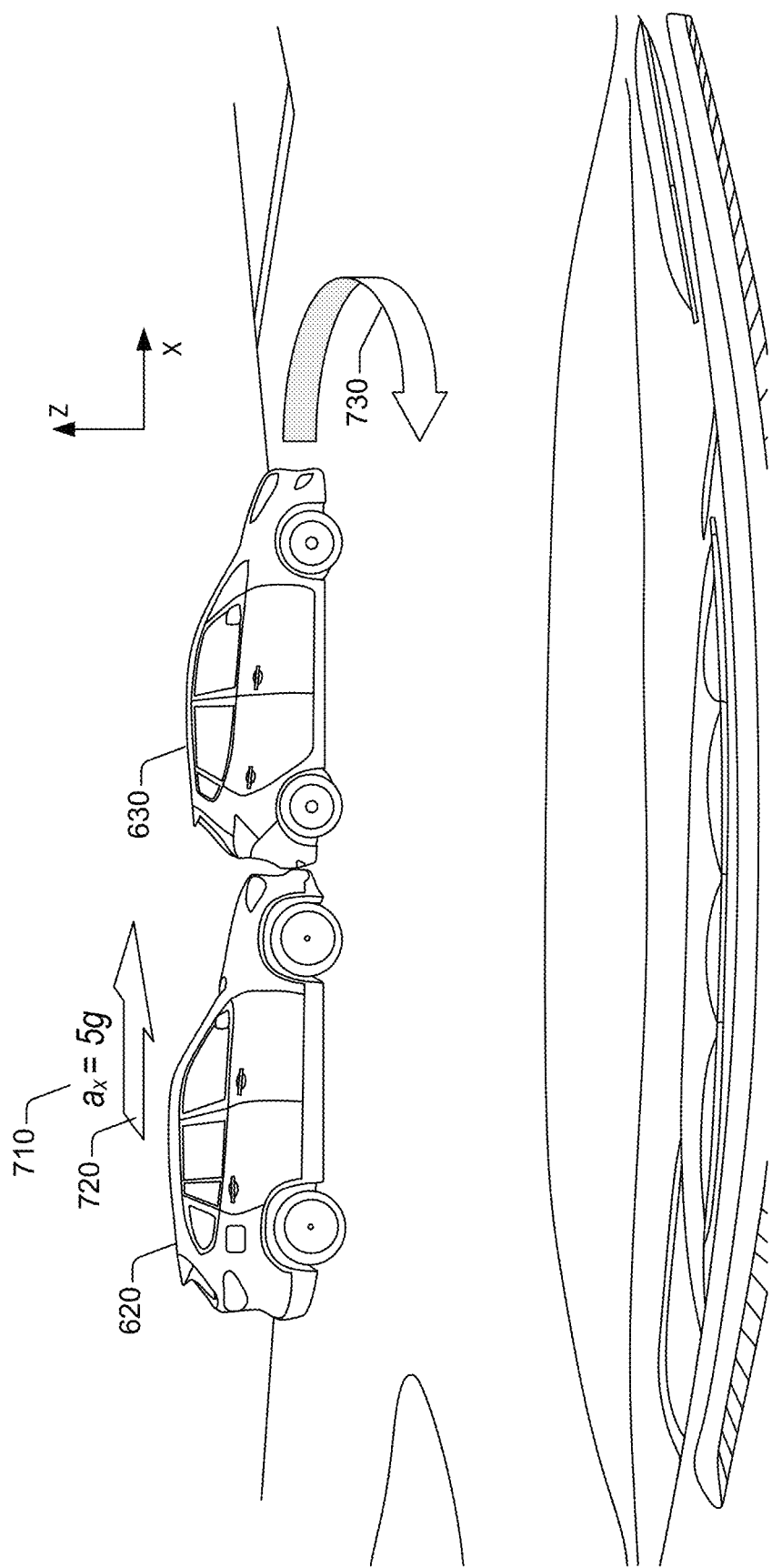
FIG. 7 presents an example of an image of a collision included in a video segment generated by a computing device included in a vehicle positioned at a distance from the collision, in accordance with one or more embodiments of this disclosure.

Such a summary also can be presented as an augmented reality (AR) video segment of the collision. In the AR video segment, various markings can be added in order to draw attention to specific elements of the collision. In one configuration, the computing device A 520 can add imaging data defining one or multiple user interface (UI) elements to the video data. The augmentation module 420 (FIG. 5B) that can be included in the computing device A 520 can generate the UI elements and can add the UI elements to the video data. In one example, a first UI element and a second UI element of the multiple UI elements can represent, respectively, an operation condition of the vehicle 620 and an operation condition of the vehicle 630. In addition, or in another example, a particular UI element of the multiple UI elements can indicate a trajectory of one of the vehicle 620 or the vehicle 630. More specifically, FIG. 7 presents an example of an image frame 700 of the AR video segment corresponding to the collision between the vehicle 620 and the vehicle 630. The image frame 700 includes a first UI element 710 that indicates a magnitude of the acceleration of the vehicle 620 in the x direction, at the time of the collision. The image frame 700 also includes a second UI element 720 that represents a direction of movement of the vehicle 620 after the collision. The image frame further includes a third UI element 730 that represents a trajectory of the vehicle 630 after the collision.

In some embodiments, rather than detecting a collision, the computing device A 520 can rely on imaging data of the traffic in the surroundings of the vehicle 110 to detect a particular event. For example, the defined event can be the presence of a particular vehicle or vehicular feature in an image of the traffic. Accordingly, the computing device A 520 can generate an image of traffic within a field of view of a camera device included in the computing device A 520. The computing device A 520 can then analyze the image to determine if a defined vehicular feature is present. The computing device A 520 can analyze the image by means of the event detection module 415 shown in FIG. 5B, for example. The defined vehicular feature can include at least one of a defined license plate, a defined make, a defined model, a defined type of painting, a defined type of wrapping, or a defined type of damage. Data retained in the event data 430 can be configured to define the vehicular feature. A determination that the defined vehicular feature is present in the image results in the detection of the defined event.

The disclosed technologies provide numerous other functionalities. In some instances, a connection may not be established between an IoT device and a computing device in response to a specific event. In such instances, the computing device can generate location information and timing information, for example, separately from the IoT device. The IoT device, in turn, also can generate another type of information. For example, a connection between a dashboard camera and a smartphone may not be established in response to an accident. Accordingly, the smartphone can generate location information and a timestamp, and the dashboard camera can generate a second timestamp and video footage of the accident. The second timestamp can be shifted (advanced or delayed) because a clocking device of the dashboard camera and another clocking device of the smartphone need not be synchronized. The smartphone also can generate other types of information that can complement or supplement the information generated by the dashboard camera. For instance, the smartphone can generate velocity, acceleration, user identification (ID), other credentials, a combination thereof, or the like.

At a later time, when a connection between the dashboard camera and the smartphone can be established, the information generated at the dashboard camera and the information generated at the smartphone can be consolidated. For illustrative purposes, this technique is referred to herein as a "stitching" feature where information from a number of resources, including the dashboard camera and the smartphone (or another type of remote device), are combined to generate a comprehensive report of an accident. Consolidating such information can include, for example, determining complementary pieces of information generated at the smartphone and the dashboard camera, and synchronizing and combining such pieces of information. The combination of complementary information can include, for example, the transmission of first information available at the smartphone, yet absent at the dashboard camera, to the dashboard camera. The combination also can include, for example, the transmission of second information available at the dashboard camera, yet absent at the smartphone, to the smartphone.

The consolidated information can be utilized as a complete representation of the accident. In some configurations, the complementary pieces of information can come from a number of external resources. For instance, a dashboard camera of another vehicle, a traffic camera, or any other sensor that can generate data that is used for a comprehensive report of an event. In some configurations, the smartphone or the dashboard camera can consolidate information regarding an accident. The information can include video data, barometric data, temperature data, weather forecast data, weather history data, precipitation measurements, location data, and the like. Such data and other contextual data can be utilized to build the confidence of report regarding an event, and all of this contextual data can be stitched together by one or more common data points such as a common timestamp, etc.

The stitching feature and related consolidation of information described above can be implemented at the time of a specific event, when a connection between the dashboard camera and the smartphone can be established. In other instances, the consolidation of information can be implemented offline, after the necessary information has been separately accessed from the dashboard camera and the smartphone. While the stitching feature is described with reference to an accident, the disclosure is not limited in that respect. The stitching feature can be applied to any of the events disclosed herein. Further, the stitching feature can be applied to other types of IoT devices and remote devices besides a dashboard camera and a smartphone.

A computing device that has access to the consolidated information can generate and present a summary of the accident. In one example, the summary can be presented as an augmented-reality (AR) video segment of the accident, in which various markings can be added in order to draw attention to specific elements of the accident. The smartphone also can send, in some instances, the consolidated information to another computing device remotely located relative to the smartphone, in response to another defined event. The other computing device can correspond to first responders or other types of authorities.

As the computing power of IoT devices increases, an IoT device can generate richer data and/or metadata in response to a specific event. For instance, upon detecting the specific event, a dashboard camera can initiate video recording at a higher frame rate relative to a recording in the absence of the specific event. In addition, or in some instances, the dashboard camera can detect an Amber Alert license plate or a license plate of a most-wanted fugitive, and can then send a timestamp for the time at which such a detection occurred and a video segment of such an event. More generally, the dashboard camera can monitor traffic to search for a group of defined license plates. In response to the dashboard camera identifying one or many license plates from the group of license plates, the dashboard camera can then communicate timestamp and, optionally, a video segment subsequent to the identification. A device connected to the dashboard camera can utilize the time stamp and the video segment in many ways.

In other embodiments, some IoT devices can recognize audio and images, such as a face. Reference audio and reference images to be recognized can be retained, respectively, in a specific audio profile and a specific image profile. In response to the recognized audio or recognized image, an IoT device can connect to a remote device or another trusted computing device. As is disclosed herein, the IoT can receive specific data and metadata from the remote device after the connection. After the data and metadata are received, the dashboard camera 114 can disconnect from the remote device 118.

In addition, or in still other embodiments, a predetermined event can be a predetermined pattern of movement detected by the dashboard camera 114. For instance, a driver can be lost, driving in circles, and such a pattern can represent the predetermined event. As another example, a driver can be swerving, which can represent the predetermined event.

Figure 8:
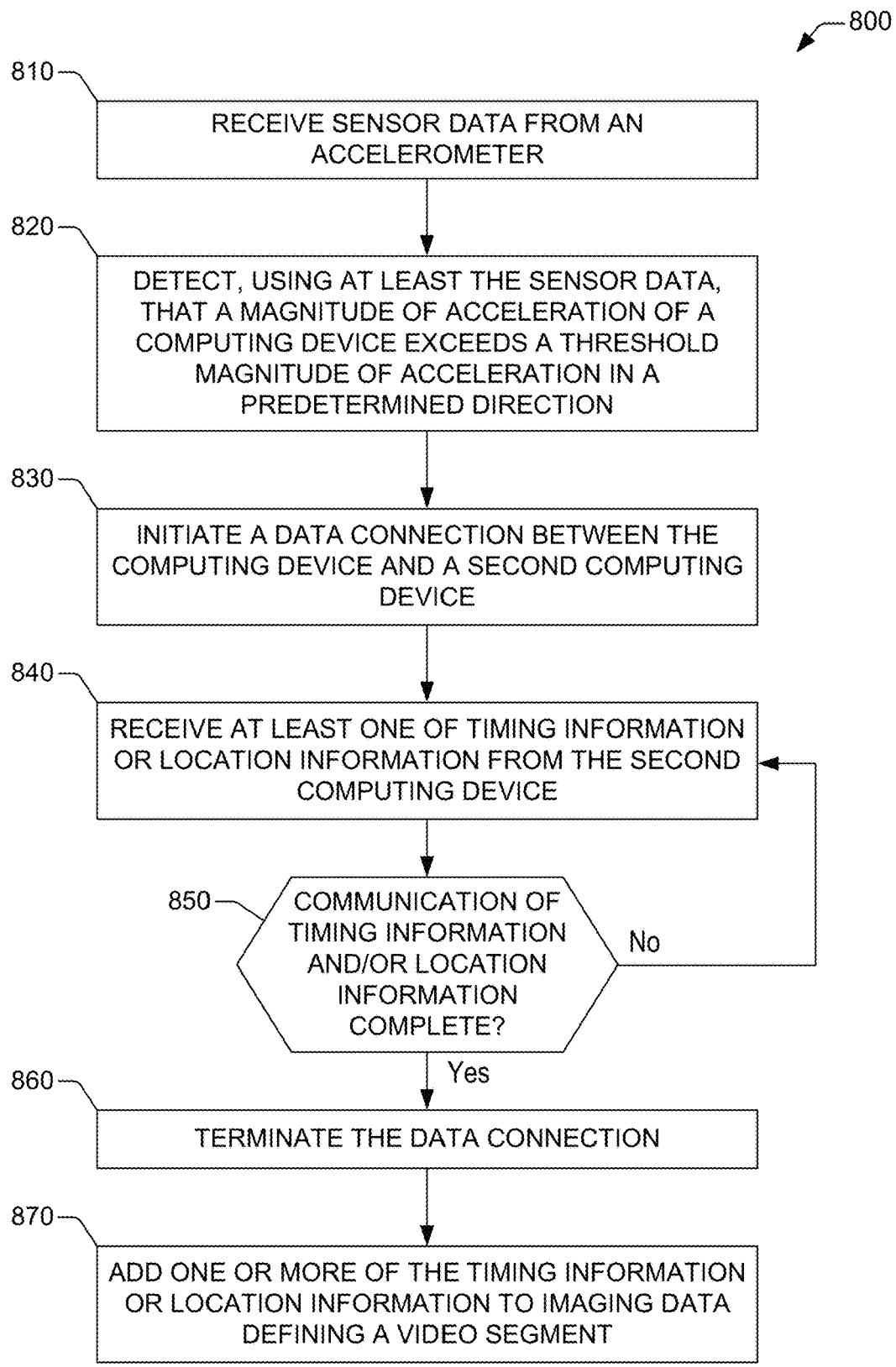
FIG. 8 presents an example of a method for dynamically controlling communication connections for computing devices based on detected events, in accordance with one or more embodiments of this disclosure.
Figure 9:
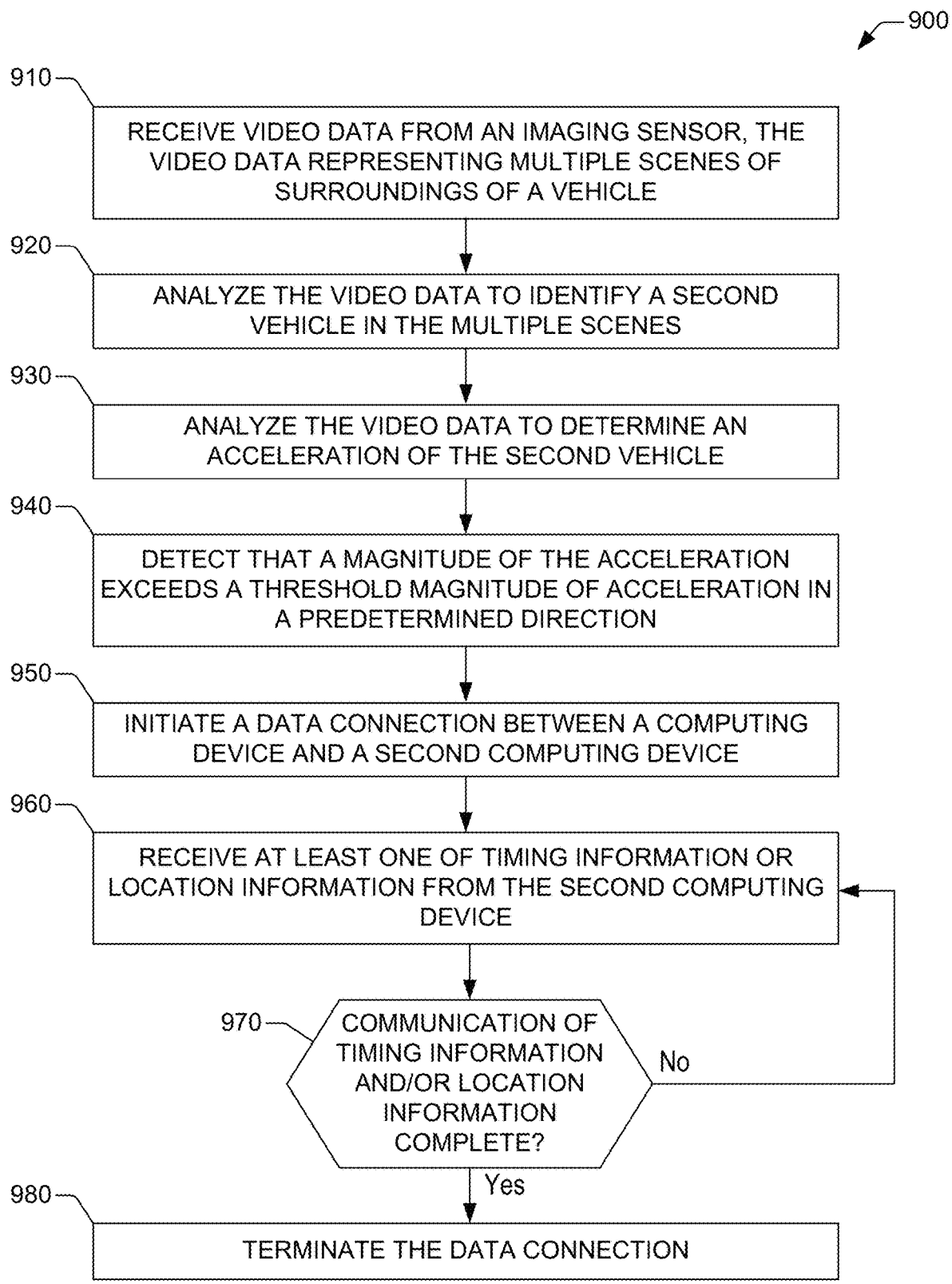
FIG. 9 presents an example of another method for dynamically controlling communication connections for computing devices, in accordance with one or more embodiments of this disclosure.

FIGS. 8-9 illustrate a flow diagrams of example methods in accordance with aspects of the technologies disclosed herein. The example methods are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other techniques described throughout this disclosure can be interpreted accordingly.

FIG. 8 presents an example of a method for provisioning information to a computing device, in accordance with one or more embodiments of this disclosure. In some embodiments, the computing devices can include IoT devices, such as mobile devices, wearable device, consumer electronic devices, or the like. A computing system can implement, entirely or partially, the example method 800. The computing system includes or is functionally coupled to one or more processors, one or more memory devices, other types of computing resources, a combination thereof, or the like. Such processor(s), memory device(s), computing resource(s), individually or in a particular combination, permit or otherwise facilitate implementing the example method 800. The computing resources can include operating systems (O/Ss); software for configuration and/or control of a virtualized environment; firmware; central processing unit(s) (CPU(s)); graphics processing unit(s) (GPU(s)); virtual memory; disk space; downstream bandwidth and/or upstream bandwidth; interface(s) (I/O interface devices, programming interface(s) (such as application programming interfaces (APIs), etc.); controller devices(s); power supplies; a combination of the foregoing; or the like.

At block 810, a processing device included in the computing device can receive sensor data from an accelerometer. The sensor data can include acceleration information of a vehicle including the computing device. The acceleration information can include the magnitude of the acceleration or the acceleration information, or both. The accelerometer also can be included, in some embodiments, within the computing device. In one embodiment, the computing device can be the computing device A 520 and the accelerometer can be part of sensor(s) 510. See FIG. 5A.

At block 820, the processing device can detect, using at least the acceleration information, that a magnitude of acceleration of the computing device exceeds a threshold magnitude of acceleration in a predetermined direction. Such a threshold magnitude can be equal to 2 g, 3 g, 4 g, or 5 g, for example. At block 830, the processing device can initiate a data connection between the computing device and a second computing device. The data connection can be initiated in response to detecting that the magnitude of acceleration of the computing device exceeds the threshold magnitude of acceleration in the predetermined direction. The second computing device can be, in some embodiments, a mobile device or a wearable device. The mobile device can be embodied in a smartphone, for example. The wearable device can be, for example, a smartwatch or an electronic wristband.

At block 840, the processing device can receive at least one of timing information or location information from the second computing device. The timing information can include, for example, a time and a date when the magnitude of acceleration of the computing device exceeded the threshold level of acceleration in the predetermined direction. The location information can include, for example, a group of coordinates of the computing device at the time when the magnitude of acceleration of the computing device exceeded the threshold in the predetermined direction. The group of coordinates can include a combination of longitude, latitude, and elevation.

At block 850, the processing device can determine if communication of the at least one of the timing information or the location information is complete. In response to a negative determination, flow of the example method 800 can return to block 840. In the alternative, flow of the example method can continue to block 860 in response to an affirmative determination. At block 860, the processing device can terminate the data connection between the computing device and the second computing device.

At block 870, the processing device can add one or more of the received timing information or the received location information to video data defining a video segment. In addition, or in some embodiments, the processing device can add the acceleration information included in the received sensor data to the video data. The video segment can be generated, in some instances, in response to the detection at block 820. In one example, the computing device can be embodied in a dashboard camera device and can generate the imaging data defining the video segment.

FIG. 9 presents an example of another method for generating a record of a vehicular accident using computing devices, in accordance with one or more embodiments of this disclosure. In some embodiments, the computing devices can include IoT devices, such as mobile devices, wearable device, consumer electronic devices, or the like. A computing system can implement, entirely or partially, the example method 900. The computing system includes or is functionally coupled to one or more processors, one or more memory devices, other types of computing resources, a combination thereof, or the like. Such processor(s), memory device(s), computing resource(s), individually or in a particular combination, permit or otherwise facilitate implementing the example method 900. The computing resources can include operating systems (O/Ss); software for configuration and/or control of a virtualized environment; firmware; central processing unit(s) (CPU(s)); graphics processing unit(s) (GPU(s)); virtual memory; disk space; downstream bandwidth and/or upstream bandwidth; interface(s) (I/O interface devices, programming interface(s) (such as application programming interfaces (APIs), etc.); controller devices(s); power supplies; a combination of the foregoing; or the like.

At block 910, a processing device included in the computing device can receive video data from an imaging sensor. The video data can represent multiple scenes corresponding to surroundings of a vehicle. For example, the vehicle can be the vehicle 110 and the multiple scenes can include the scene shown in FIG. 6A. In one configuration, the imaging sensor can be functionally coupled to the computing device (see, e.g., FIG. 5A). In another configuration, the imaging sensor can be integrated into the computing device (see, e.g., FIG. 5B).

At block 920, the processing device can analyze the video data to identify a second vehicle in at least a group of the multiple scenes. More specifically, the processing device can identify the second vehicle in a first scene of the multiple scenes, and can continue identifying the vehicle across other scenes subsequent to the first scene. In other words, the processing device can track the second vehicle across the group of multiple scenes. In some configurations, the video data defines multiple image frames at a defined frame rate, each one of the multiple image frames corresponding to a scene of the multiple scenes. Thus, analyzing the video data to identify the second vehicle in at least the group of the multiple scenes can include determining a sequence of positions of the second vehicle in respective consecutive image frames of the multiple image frames. Continuing with the example above in the description of block 910, the processing device can identify the vehicle 410 in the scene shown in FIG. 4A and can track the vehicle 410 across subsequent scenes from the vantage point of the vehicle 110.

At block 930, the processing device can analyze the video data to determine an acceleration of the. To that end, the processing device can access the sequence of positions of the second vehicle, and can then generate an estimate of the acceleration using the sequence of positions and the defined frame rate. At block 940, using the estimate of the acceleration of the second vehicle, the processing device can detect that a magnitude of the acceleration exceeds a threshold magnitude of acceleration in a predetermined direction.

At block 950, the processing device can initiate a data connection between the computing device and a second computing device. The data connection can be initiated in response to detecting that the magnitude of acceleration of the second vehicle exceeds the threshold magnitude of acceleration in the predetermined direction. The second computing device can be, in some embodiments, a mobile device or a wearable device. At block 960, the processing device can receive at least one of timing information or location information from the second computing device. The timing information can include, for example, a time and a date when the magnitude of acceleration of the second vehicle exceeded the threshold level of acceleration in the predetermined direction. The location information can include, for example, coordinates of the computing device at the time when the magnitude of acceleration of the second vehicle exceeded the threshold in the predetermined direction. The coordinates can include longitude and latitude. In some instances, elevation also can be included in the coordinates. For illustrative purposes, the coordinates can also be referred to herein as a group of coordinates.

At block 970, the processing device can determine if communication of the at least one of the received timing information or the received location information is complete. In response to a negative determination, flow of the example method 900 can return to block 960. In the alternative, flow of the example method 900 can continue to block 980 in response to an affirmative determination. At block 980, the processing device can terminate the data connection between the computing device and the second computing device.

Figure 10:
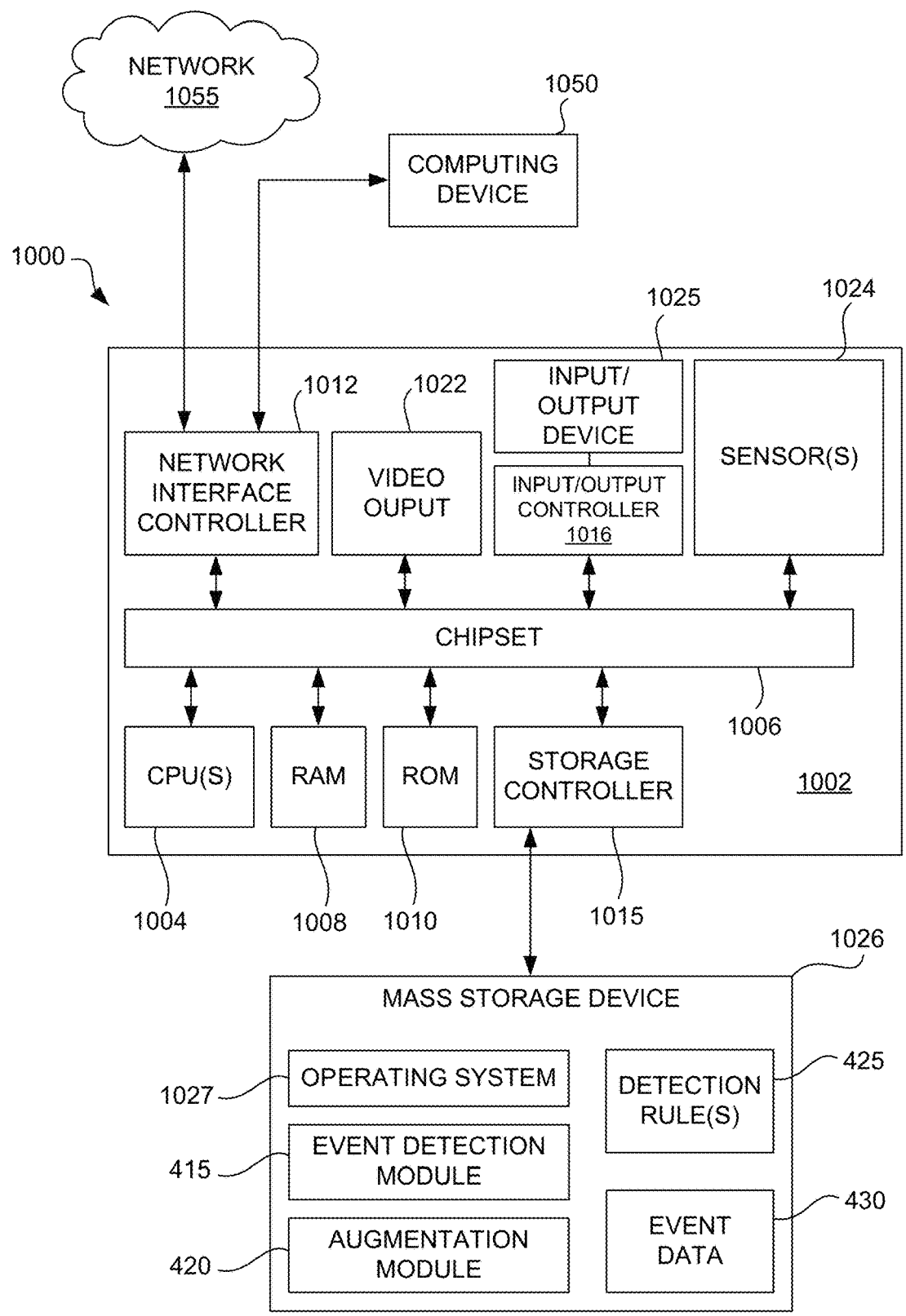
FIG. 10 presents an example of a computing environment for the implementation of the dynamic control of communication connections for computing devices, in accordance with one or more embodiments of this disclosure.

FIG. 10 shows additional details of an example computer architecture for the components capable of executing the program components described above for providing automated network connection sharing. The computer architecture shown in FIG. 10 includes a computing device 1000 that can embody, in some configurations, an IoT device that operates in accordance with aspects of the disclosure. In one example embodiments, the computing device 1000 can embody the dashboard camera 114 (see, e.g., FIG. 1) or a network appliance. In other configurations, the computing device 1000 can embody another type of computing device, such as the computing device A 520. In other examples, the computing device 1000 can embody, or can constitute, a game console, a server computer, a workstation, a desktop computer, a laptop, a tablet, a phablet, a personal digital assistant (PDA), an e-reader, a digital cellular phone, or other computing device, and may be utilized to execute any of the software components presented herein. The computer architecture shown in FIG. 10 may be utilized to execute any of the software components described above to implement the reactive mechanisms for provisioning information to an IoT device or other types of computing devices. Although some of the components described herein are specific to an IoT device, it can be appreciated that such components, and other components may be part of a remote computer (such as the wearable device 110).

The computing device 1000 includes a baseboard 402, or "motherboard," which is a printed circuit board to which a multitude of components or devices may be connected by way of a system bus or other electrical communication paths. In one embodiment, one or more central processing units (CPUs) 1004 operate in conjunction with a chipset 1006. The CPUs 1004 may be standard programmable processors that perform arithmetic and logical operations necessary for the operation of the computing device 1000.

The CPUs 404 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 may provide an interface to a RAM 408, used as the main memory in the computing device 1000. The chipset 406 may further provide an interface to a computer-readable storage medium such as a read-only memory ("ROM") 410 or non-volatile RAM ("NVRAM") for storing basic routines that help to startup the computing device 1000 and to transfer information between the various components and devices. The ROM 410 or NVRAM may also store other software components necessary for the operation of the computing device 1000 in accordance with the embodiments described herein.

The computing device 1000 may operate in a networked environment using logical connections to remote computing devices and computer systems through a network, such as the local area network 455. The chipset 406 may include functionality for providing network connectivity through a network interface controller (NIC) 1012, such as a gigabit Ethernet adapter. The NIC 1012 is capable of connecting the computing device 1000 to other computing devices over the network 1055. For illustrative purposes, the NIC 1012 is also referred to herein as the wireless communication module. The NIC 1012 may include the necessary circuitry for establishing wired or wireless communication between the computing device 1000 and any other computer or network. Wireless communication can be implemented according to various radio technology protocols, including, for example, Bluetooth™, NFC, other short-range point-to-point wireless communication protocols, and the like. A combination of the chipset 1006 and the NIC 1012 can embody one or more of the communication components 410.

It should be appreciated that multiple NICs 1012 may be present in the computing device 1000, connecting such a computing device to other types of networks and remote computer systems. The network 1055 permits the computing device 1000 to communicate with remote services and servers. The NIC 1012 or other components may be utilized to provide network or Internet access to an external computing device 1050. The computing device 1050 can embody the remote device 118 or the computing device B 530 described herein. The computing device 1050 can include, in some embodiments, at least some of the components included in the computing device 1000. For instance, the computing device 1050 can include the CPU(s) 1004, the mass storage device 1026, the NIC 1012, and the chipset 1006. At least such components can permit the operation of the computing device 1050 in accordance with functionality described herein.

The computing device 1000 may be connected to a mass storage device 426 that provides non-volatile storage for the computing device. The mass storage device 426 may store system programs, application programs, other program modules, and data, which have been described in greater detail herein. The mass storage device 426 may be connected to the computing device 1000 through a storage controller 415 connected to the chipset 406. The mass storage device 426 may consist of one or more physical storage units. The storage controller 415 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 426, other storage media and the storage controller 415 may include MultiMediaCard (MMC) components, eMMC components, Secure Digital (SD) components, PCI Express components, or the like.

The computing device 1000 may store data on the mass storage device 426 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 426 is characterized as primary or secondary storage, and the like.

For example, the computing device 1000 may store information to the mass storage device 426 by issuing instructions through the storage controller 415 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1026 by detecting the physical states or characteristics of one or more particular locations within the physical storage units.

In addition to the mass storage device 426 described above, the computing device 1000 may have access to other computer-readable media to store and retrieve information, such as program modules, data structures, or other data. Thus, although the event detection module 415, the augmentation module 420, detection rule(s) 425, event data 430, and other modules are depicted as data and software stored in the mass storage device 426, these components and/or other modules may be stored, at least in part, in other computer-readable storage media of the computing device 1000. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computing device 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 1000. For purposes of the claims, the phrase "computer storage medium," and variations thereof, does not include waves or signals per se and/or communication media.

The mass storage device 426 may store an operating system 427 utilized to control the operation of the computing device 1000. According to one embodiment, the operating system comprises a gaming operating system. According to another embodiment, the operating system comprises any software that can control the processor. According to further embodiments, the operating system may comprise the UNIX ANDROID operating systems. It should be appreciated that other operating systems may also be utilized. The mass storage device 426 may store other system or application programs and data utilized by the computing device 1000, such as the event detection module 415, the augmentation module 420, detection rule(s) 425, the event data 430, and/or any of the other software components and data described above. The event data 430, may store data generated by the event detection module 415 or the augmentation module 420, or both. For instance, if a Bluetooth pairing is initiated between two computers (e.g., computing device 520A and computing device 530), data characterizing such pairings (e.g., messages 532) may be stored in the event data 430. The mass storage device 426 also can store other programs and data not specifically identified herein.

In one embodiment, the mass storage device 426 or other computer-readable storage media is encoded with computer-executable instructions which, when loaded into the computing device 1000, transform the computer from a general-purpose computing system into a special-purpose computer capable of implementing the embodiments described herein. These computer-executable instructions transform the computing device 1000 by specifying how the CPUs 404 transition between states, as described above. According to one embodiment, the computing device 1000 has access to computer-readable storage media storing computer-executable instructions which, when executed by the computing device 1000, perform the various technologies described above with regard to FIG. 1A to 7 and/or any of the technologies disclosed herein. The computing device 1000 might also include computer-readable storage media for performing any of the other computer-implemented operations described herein.

The computing device 1000 may also include one or more input/output controllers 416 for receiving and processing input from a number of input devices, such as a keyboard, a mouse, a microphone, a headset, a touchpad, a touch screen, an electronic stylus, or any other type of input device. Also shown, the input/output controllers 1016 is in communication with an input/output device 425. The input/output controller 1016 may provide output to a display, such as a computer monitor, a flat-panel display, a digital projector, a printer, a plotter, or other type of output device. The input/output controller 416 may provide input communication with other electronic devices, such as game controllers and/or audio devices. In addition, or alternatively, a video output 422 may be in communication with the chipset 406 and operate independent of the input/output controllers 1016.

The computing device 1000 also can include a group of sensors 1024. The sensor(s) 1024 can include one or a combination of inertial sensors (e.g., an accelerometer or a gyroscope, or both); imaging sensors; pressure sensors; temperature sensors; electric charge sensors; or the like. Thus, in some configuration, the sensor(s) 1024 can embody one of the accelerometer 510, the sensor(s) 510, or the sensor(s) 590. In other configurations, at least one of the sensor(s) 1024 can constitute the camera components 405. It is noted that the computing device 1000 may not include all of the components shown in FIG. 10, may include other components that are not explicitly shown in FIG. 10, or may utilize an architecture completely different than that shown in FIG. 10. Based on the foregoing, it should be appreciated that technologies for reactive provisioning of information to IoT devices have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The following examples are provided to supplement the present disclosure.

Example A: a method, comprising: receiving sensor data from an accelerometer, the sensor data including acceleration information of a vehicle including a first computing device; detecting, by the first computing device, using at least the acceleration information, that a magnitude of acceleration of the first computing device exceeds a threshold magnitude of acceleration in a predetermined direction; in response to detecting that the magnitude of acceleration exceeds the threshold magnitude of acceleration in the predetermined direction, initiating a data connection between the first computing device and a second computing device; receiving, by the first computing device, at least one of timing information or location information from the second computing device; and terminating the data connection between the first computing device and the second computing device.

Example B: The method of Example A, further comprising: detecting, by the first computing device, using at least the acceleration information, a magnitude of acceleration of the first computing device in a second predetermined direction, wherein the data connection between the first computing device and a second computing device is initiated in response to determining that the magnitude of acceleration of the first computing device in the second predetermined direction is less than the magnitude of acceleration of the first computing device in the predetermined direction.

Example C: The method of Examples A and B further comprising: detecting, by the first computing device, using at least the acceleration information, a magnitude of acceleration of the first computing device in a second predetermined direction, wherein the data connection between the first computing device and a second computing device is initiated in response to: detecting that the magnitude of acceleration of the first computing device exceeds the threshold magnitude of acceleration in the predetermined direction, and determining that the magnitude of acceleration of the first computing device in the predetermined direction is greater by a predetermined difference than the magnitude of acceleration of the first computing device in the second predetermined direction.

Example D: The method of Examples A through C, wherein the timing information comprises a time and a date when the magnitude of acceleration of the first computing device exceeded the threshold level of acceleration in the predetermined direction.

Example E: The method of Examples A through D, wherein the location information comprises a group of coordinates of the first computing device at a time when the magnitude of acceleration of the first computing device exceeded the threshold in the predetermined direction.

Example F: The method of Examples A through E, wherein the data connection between the first computing device and the second computing device is terminated in response to completing communication of the at least one of the timing information, the location information, or the acceleration information.

Example G: The method of Examples A through F, wherein the first computing device comprises a dashboard camera device, the method further comprising adding one or more of the received acceleration information, the received timing information, or the received location information to video data defining a video segment generated by the dashboard camera device after the detecting.

Example H: The method of Examples A through G, wherein initiating the data connection comprises initiating wireless pairing the first computing device with an electronic wristband device, a smartwatch, or a smartphone.

Example I: A method, comprising: receiving video data from an imaging sensor, the video data representative of multiple scenes corresponding to surroundings of a first vehicle; analyzing the video data to identify a second vehicle in at least one of the multiple scenes; analyzing the video data to determine an acceleration of the second vehicle; detecting, by a first computing device, that a magnitude of acceleration of the second vehicle exceeds a threshold magnitude of acceleration in a predetermined direction; in response to detecting that the magnitude of acceleration of the second vehicle exceeds the threshold in a predetermined direction, initiating a data connection between the first computing device and a second computing device; receiving, by the first computing device, at least one of timing information or location information; and terminating the data connection between the first computing device and the second computing device.

Example J: The method of Example I, wherein the video data defines multiple image frames at a defined frame rate, each one of the multiple image frames corresponds to a scene of the multiple scenes, and wherein analyzing the video data to determine the acceleration of the second vehicle comprises: determining a sequence of positions of the second vehicle in respective consecutive image frames of the multiple image frames; and generating an estimate of the acceleration using the sequence of positions and the defined frame rate.

Example K: The method of Examples I and J, wherein the timing information comprises a time and a date when the magnitude of acceleration of the second vehicle exceeded the threshold level of acceleration in the predetermined direction.

Example L: The method of Examples I through K, wherein the location information comprises a group of coordinates of the first computing device at a time when the magnitude of acceleration of the second vehicle exceeded the threshold magnitude in the predetermined direction.

Example M: The method of Examples I through L, wherein the first computing device comprises a dashboard camera device, the method further comprising adding one or more of the received acceleration information, the received timing information, or the received location information to second video data defining a video segment generated by the dashboard camera device after the detecting.

Example N: A computing device, comprising, one or more processors; and a memory in communication with the one or more processors, the memory having computer-executable instructions stored thereupon that, when executed by the one or more processors, cause the computing device to perform operations comprising: receiving sensor data indicative of a measurement of a physical property of an object; detecting, using the sensor data, an occurrence of a defined event, the defined event including a change in a physical property of an object, wherein the change satisfies one or more criteria; in response to the detecting that the physical property of the object satisfies the one or more criteria, initiating a data connection between the computing device and a second computing device; receiving at least one of timing information or location information corresponding to the occurrence of the defined event from the second computing device; and terminating the data connection between the computing device and the second computing device.

Example O: The computing device of Example N, wherein the physical property comprises one of an acceleration, a linear velocity, an angular velocity, a position, a temperature, or a pressure, and wherein the defined event comprises an accident involving a vehicle.

Example P: The computing device of Example N and O, wherein the location information comprises a coordinates of the computing device at a time when the change of in the defined physical property has the magnitude that exceeded the threshold amount.

Example Q: The computing device of Example N through P, wherein the computing device comprises a camera device, the operations comprising adding one or more of the received timing information or the received location information to second video data defining a video segment generated by the camera device after the detecting.

Example R: The computing device of Example N through Q, the operations further comprising adding imaging data defining one or more user interface (UI) elements to the second video data, wherein a particular UI element of the one or more UI elements represents an operation condition of the second vehicle.

Example S: The computing device of Example N through R, wherein the computing device comprises a camera device, the operations further comprising: initiating recordation of a video segment at a first frame rate in response to the detecting, the first frame rate being greater than a second frame rate configured for recordation of video footage in the absence of the defined event.

Example T: The computing device of Example N through R, wherein the detecting comprises: generating an image of traffic within a field of view of the camera device; analyzing the image for presence of a defined vehicular feature, wherein the defined vehicular feature comprises at least one of a defined license plate, a defined make, a defined model, a defined type of painting, a defined type of wrapping, or a defined type of damage; and determining that the defined vehicular feature is present in the image.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A method, comprising:
receiving sensor data from an accelerometer, the sensor data including acceleration information of a vehicle including a first computing device;
detecting, by the first computing device, using at least the acceleration information, that a magnitude of acceleration of the first computing device exceeds a threshold magnitude of acceleration in a predetermined direction;
in response to detecting that the magnitude of acceleration exceeds the threshold magnitude of acceleration in the predetermined direction, initiating a data connection between the first computing device and a second computing device;
receiving, by the first computing device, at least one of timing information or location information from the second computing device; and
terminating the data connection between the first computing device and the second computing device.

2. The method of claim 1, further comprising:
detecting, by the first computing device, using at least the acceleration information, a magnitude of acceleration of the first computing device in a second predetermined direction,
wherein the data connection between the first computing device and a second computing device is initiated in response to determining that the magnitude of acceleration of the first computing device in the second predetermined direction is less than the magnitude of acceleration of the first computing device in the predetermined direction.

3. The method of claim 1, further comprising:
detecting, by the first computing device, using at least the acceleration information, a magnitude of acceleration of the first computing device in a second predetermined direction,
wherein the data connection between the first computing device and a second computing device is initiated in response to:
detecting that the magnitude of acceleration of the first computing device exceeds the threshold magnitude of acceleration in the predetermined direction, and
determining that the magnitude of acceleration of the first computing device in the predetermined direction is greater by a predetermined difference than the magnitude of acceleration of the first computing device in the second predetermined direction.

4. The method of claim 1, wherein the timing information comprises a time and a date when the magnitude of acceleration of the first computing device exceeded the threshold level of acceleration in the predetermined direction.

5. The method of claim 1, wherein the location information comprises a group of coordinates of the first computing device at a time when the magnitude of acceleration of the first computing device exceeded the threshold in the predetermined direction.

6. The method of claim 1, wherein the data connection between the first computing device and the second computing device is terminated in response to completing communication of the at least one of the timing information, the location information, or the acceleration information.

7. The method of claim 1, wherein the first computing device comprises a dashboard camera device, the method further comprising adding one or more of the received acceleration information, the received timing information, or the received location information to video data defining a video segment generated by the dashboard camera device after the detecting.

8. The method of claim 1, wherein initiating the data connection comprises initiating wireless pairing the first computing device with an electronic wristband device, a smartwatch, or a smartphone.

9. A method, comprising:
receiving video data from an imaging sensor, the video data representative of multiple scenes corresponding to surroundings of a first vehicle;
analyzing the video data to identify a second vehicle in at least one of the multiple scenes;
analyzing the video data to determine an acceleration of the second vehicle;
detecting, by a first computing device, that a magnitude of acceleration of the second vehicle exceeds a threshold magnitude of acceleration in a predetermined direction;
in response to detecting that the magnitude of acceleration of the second vehicle exceeds the threshold in a predetermined direction, initiating a data connection between the first computing device and a second computing device;
receiving, by the first computing device, at least one of timing information or location information; and
terminating the data connection between the first computing device and the second computing device.

10. The method of claim 9, wherein the video data defines multiple image frames at a defined frame rate, each one of the multiple image frames corresponds to a scene of the multiple scenes, and wherein analyzing the video data to determine the acceleration of the second vehicle comprises:
determining a sequence of positions of the second vehicle in respective consecutive image frames of the multiple image frames; and
generating an estimate of the acceleration using the sequence of positions and the defined frame rate.

11. The method of claim 9, wherein the timing information comprises a time and a date when the magnitude of acceleration of the second vehicle exceeded the threshold level of acceleration in the predetermined direction.

12. The method of claim 9, wherein the location information comprises a group of coordinates of the first computing device at a time when the magnitude of acceleration of the second vehicle exceeded the threshold magnitude in the predetermined direction.

13. The method of claim 9, wherein the first computing device comprises a dashboard camera device, the method further comprising adding one or more of the received acceleration information, the received timing information, or the received location information to second video data defining a video segment generated by the dashboard camera device after the detecting.

14. A computing device, comprising,
one or more processors; and
a memory in communication with the one or more processors, the memory having computer-executable instructions stored thereupon that, when executed by the one or more processors, cause the computing device to perform operations comprising:
receiving sensor data indicative of a measurement of a physical property of an object;
detecting, using the sensor data, an occurrence of a defined event, the defined event including a change in a physical property of an object, wherein the change satisfies one or more criteria;
in response to the detecting that the physical property of the object satisfies the one or more criteria, initiating a data connection between the computing device and a second computing device;
receiving at least one of timing information or location information corresponding to the occurrence of the defined event from the second computing device; and
terminating the data connection between the computing device and the second computing device.

15. The computing device of claim 14, wherein the physical property comprises one of an acceleration, a linear velocity, an angular velocity, a position, a temperature, or a pressure, and wherein the defined event comprises an accident involving a vehicle.

16. The computing device of claim 14, wherein the location information comprises a coordinates of the computing device at a time when the change of in the defined physical property has the magnitude that exceeded the threshold amount.

17. The computing device of claim 14, wherein the computing device comprises a camera device, the operations comprising adding one or more of the received timing information or the received location information to second video data defining a video segment generated by the camera device after the detecting.

18. The computing device of claim 17, the operations further comprising adding imaging data defining one or more user interface (UI) elements to the second video data, wherein a particular UI element of the one or more UI elements represents an operation condition of the second vehicle.

19. The computing device of claim 14, wherein the computing device comprises a camera device, the operations further comprising:
   initiating recordation of a video segment at a first frame rate in response to the detecting, the first frame rate being greater than a second frame rate configured for recordation of video footage in the absence of the defined event.

20. The computing device of claim 19, wherein the detecting comprises:
   generating an image of traffic within a field of view of the camera device;
   analyzing the image for presence of a defined vehicular feature, wherein the defined vehicular feature comprises at least one of a defined license plate, a defined make, a defined model, a defined type of painting, a defined type of wrapping, or a defined type of damage; and
   determining that the defined vehicular feature is present in the image.

* * * * *